(12) United States Patent
Iwamitsu et al.

(10) Patent No.: US 7,047,450 B2
(45) Date of Patent: May 16, 2006

(54) STORAGE SYSTEM AND A METHOD FOR DIAGNOSING FAILURE OF THE STORAGE SYSTEM

(75) Inventors: Koji Iwamitsu, Odawara (JP); Kenji Oonabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 10/658,530

(22) Filed: Sep. 10, 2003

(65) Prior Publication Data
US 2005/0010843 A1    Jan. 13, 2005

(30) Foreign Application Priority Data
Jul. 11, 2003  (JP) .............................. 2003-195450

(51) Int. Cl.
*G06F 11/00* (2006.01)

(52) U.S. Cl. ............................................. 714/43; 714/4

(58) Field of Classification Search .................. 714/43
See application file for complete search history.

(56) References Cited

U.S. PATENT DOCUMENTS

| | | | |
|---|---|---|---|
| 5,392,302 A | 2/1995 | Kemp et al. | |
| 5,611,069 A | 3/1997 | Matoba | |
| 5,922,077 A | 7/1999 | Espy et al. | |
| 5,941,992 A * | 8/1999 | Croslin et al. ............... | 714/4 |
| 5,991,891 A | 11/1999 | Hahn et al. | |
| 6,128,750 A | 10/2000 | Espy et al. | |
| 6,219,753 B1 | 4/2001 | Richardson | |
| 6,247,077 B1 * | 6/2001 | Muller et al. ................. | 710/74 |
| 6,289,002 B1 * | 9/2001 | Henson et al. ............... | 370/222 |
| 6,571,355 B1 * | 5/2003 | Linnell .......................... | 714/9 |
| 6,574,687 B1 * | 6/2003 | Teachout et al. .............. | 710/38 |
| 6,598,174 B1 | 7/2003 | Parks et al. | |
| 6,643,795 B1 | 11/2003 | Sicola et al. | |
| 6,658,504 B1 * | 12/2003 | Lieber et al. ................. | 710/52 |
| 6,678,839 B1 | 1/2004 | Mori | |
| 6,725,293 B1 | 4/2004 | Nakayama et al. | |
| 6,795,934 B1 | 9/2004 | Nagata et al. | |
| 2001/0014956 A1 * | 8/2001 | Nagata et al. ................. | 714/8 |
| 2002/0002440 A1 | 1/2002 | Sakai | |
| 2002/0019897 A1 | 2/2002 | Cruyningen | |
| 2003/0005352 A1 * | 1/2003 | Beer et al. ..................... | 714/4 |
| 2003/0135872 A1 | 7/2003 | Matsunami et al. | |
| 2003/0188233 A1 | 10/2003 | Lubbers et al. | |
| 2004/0019833 A1 * | 1/2004 | Riedl ............................ | 714/43 |

FOREIGN PATENT DOCUMENTS

| | | |
|---|---|---|
| JP | 57-101950 | 6/1982 |
| JP | 58-114125 | 7/1983 |
| JP | 2002007077 | 1/2002 |

* cited by examiner

*Primary Examiner*—Robert Beausoliel
*Assistant Examiner*—Michael Maskulinski
(74) *Attorney, Agent, or Firm*—Mattingly, Stanger, Malur & Brundidge, P.C.

(57) ABSTRACT

A storage system includes at least one storage medium, at least one controller to control the storage medium, and a communication path to connect the storage medium and the controller in a loop for communication between the controller and the storage medium, wherein a failure diagnosis is performed to locate a failure while performing normal read/write operations.

22 Claims, 16 Drawing Sheets

STORAGE SYSTEM AND A METHOD FOR DIAGNOSING FAILURE OF THE STORAGE SYSTEM

FIELD OF THE INVENTION

The present invention relates to a storage system and an information processing technology and more particularly to a technology effectively applied to a storage system and an information processing system both of which have a plurality of constitutional elements connected together by a communication path such as a fiber channel loop.

BACKGROUND OF THE INVENTION

With advances in information processing technologies in recent years, roles played by information processing systems and storage systems are rapidly increasing. Demands on the information processing systems and storage systems for higher performance, higher reliability and larger capacity are growing significantly. In network technologies there is also a growing demand for faster speed.

As one of such super-fast gigabit network technologies a fiber channel (FC) is known. Using the FC allows a plurality of hard disk drives and a controller of the storage system to be connected in loop to build a storage system. Among the connection methods using the fiber channel (FC) loop is a fiber channel-arbitrated loop (FC-AL). The FC-AL connects a controller of the storage system and hard disk drives in a loop.

In the event that the FC loop breaks or fails even at one location, communication between the controller and the hard disk drives is rendered impossible because of the standard specification of the FC loop and therefore the entire FC loop in which a trouble has occurred is removed out of service.

To allow for replacement of hard disk drives and also deal with their failures, a port bypass circuit (PBC) is provided to bypass (disconnect) a part of the FC loop or hard disk drives.

The controller needs to switch the PBC to control the loop so that the entire loop will not be affected by a failed portion of the loop.

SUMMARY OF THE INVENTION

An object of the present invention is to provide a storage system capable of detecting a faulty part and recovering from a malfunction without stopping normal processing.

To achieve the above objective, the present invention is characterized by a system which includes at least one storage medium, at least one controller to control the storage medium, and a communication path for connecting the storage medium and the controller in loop to effect mutual communication between the controller and the storage medium, wherein the system can locate a faulty part while at the same time performing processing, such as read/write operations, from higher level devices.

Further, this invention is characterized in that the communication path has at least one signal detection means for detecting signal degradations in order to predict a possible failure.

With this invention, it is possible to detect a faulty part while at the same time performing normal processing.

Other objects, features and advantages of the invention will become apparent from the following description of the embodiments of the invention taken in conjunction with the accompanying drawings.

BRIEF DESCRIPTION OF THE DRAWINGS

Preferred embodiments of the present invention will now be described in conjunction with the accompanying drawings, in which.

DESCRIPTION OF THE EMBODIMENTS

Now, embodiments of the present invention will be described with reference to the accompanying drawings.

(First Embodiment)

Figure 1:
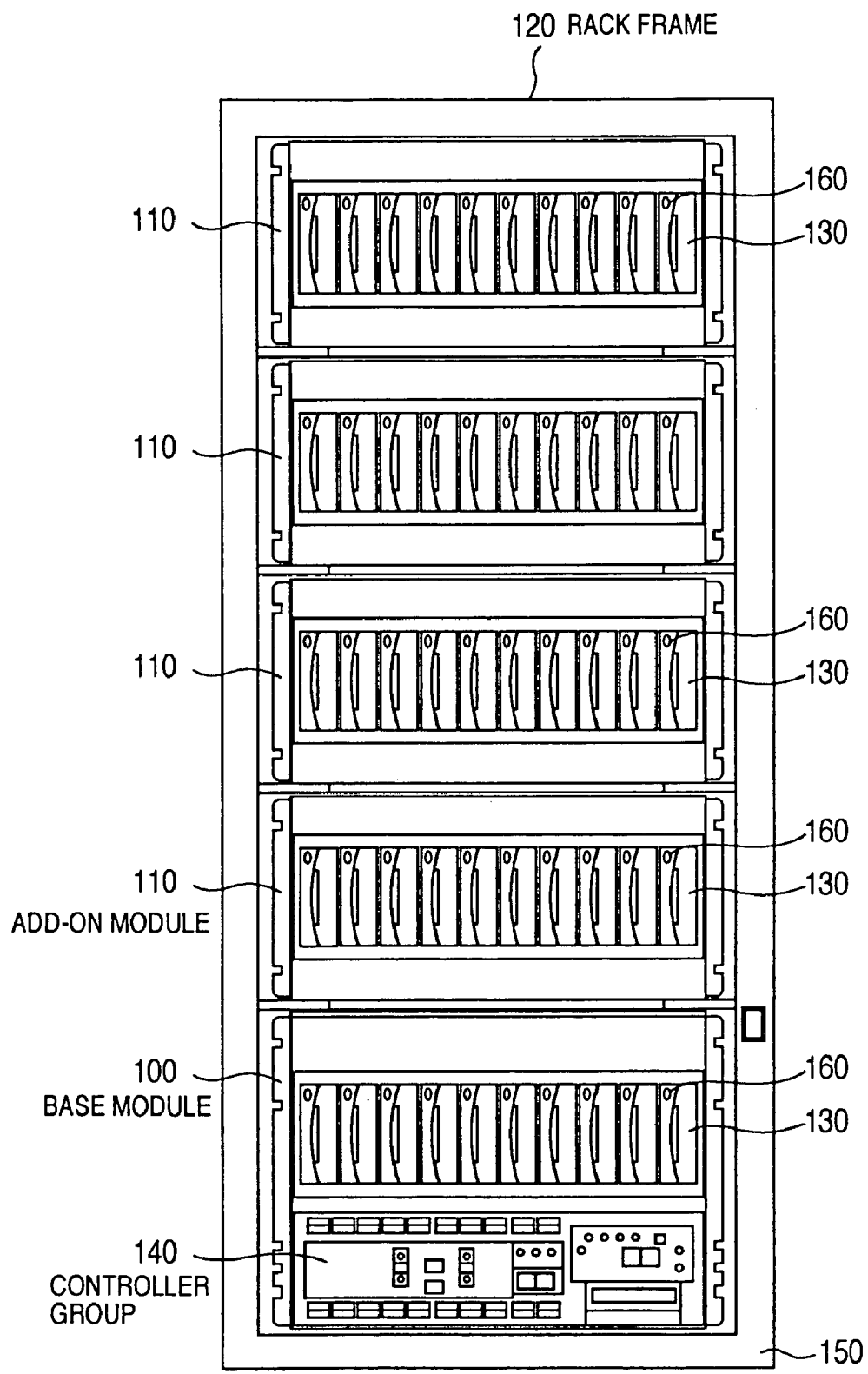
FIG. 1 is an external view of a storage system according to a first embodiment.

FIG. 1 illustrates an example external view of an apparatus in a storage system 150 according to this embodiment. A rack frame 120 accommodates a base module 100 and add-on modules 110. Installed in the base module 100 are hard disk drives 130 and a controller group 140. The add-on modules 110 are used to increase a storage capacity of the storage system and have a plurality of hard disk drives 130. If a further increase in storage capacity is desired, it is possible to use an additional rack frame and additional add-on modules 110.

Figure 2:
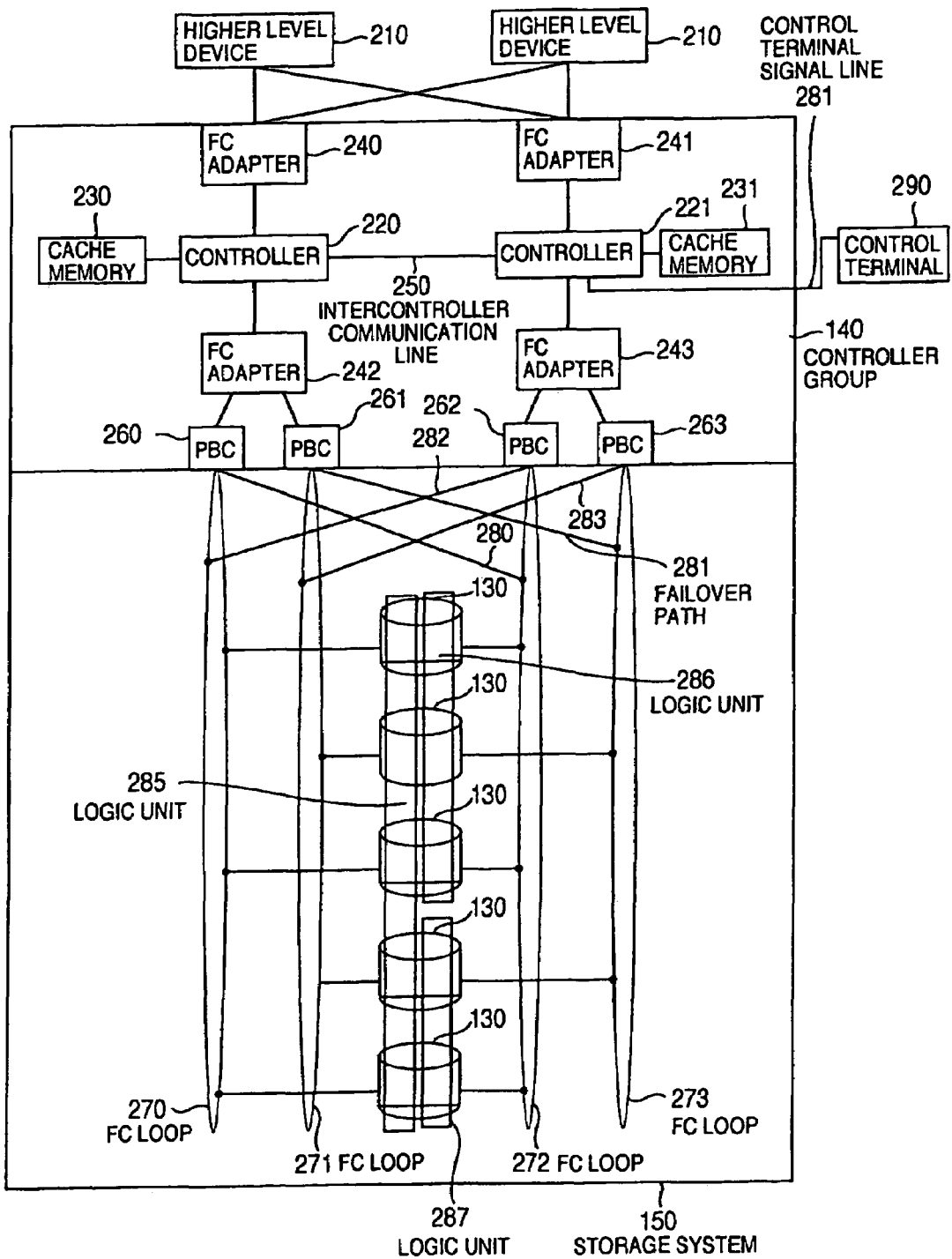
FIG. 2 is a conceptual diagram showing a loop configuration of the storage system in the first embodiment.

FIG. 2 is a conceptual diagram showing an inner configuration of the storage system 150. In this embodiment, we take up an example case in which a fiber channel-arbitrated loop (hereinafter referred to simply as an FC loop) is used as a communication path in the storage system.

The storage system 150 comprises a controller group 140, FC loops 270–273 and a number of hard disk drives 130. The controller group 140 has two controllers 220, 221 for redundancy. The controller group 140 is connected to cache memories 230, 231, which temporarily store management information on hard disk drives 130, to FC adapters 240, 241 that establish communication between a higher level device 210 and the controller and perform signal conversion, and also to FC adapters 242, 243 that convert signals transferred between the controller group 140 and the hard disk drives 130. Connected between the hard disk drives 130 and the FC adapters 242, 243 are PBCs (port bypass circuits) 260–263 and FC loops 270–273. The controllers 220, 221 control the FC loops 270–273.

Communication between the two controllers 220, 221 is made through an intercontroller communication line 250. The controllers 220, 221, based on commands from the higher level device 210, control the hard disk drives 130. The FC adapters 240, 241 perform conversion of signals transferred between the controllers 220, 221 and the higher level device 210 and other associated processing. The FC adapters 242, 243 perform conversion of signals communicated between the controllers 220, 221 and the hard disk drives 130 and also perform switching of the PBCs 260–263. The PBCs 260–263 can connect to failover paths 280–283 to change the FC loops used by the controllers 220, 221. For example, the PBC 260 may switch from an FC loop 270 to a failover path 280 to connect to an FC loop 272. While in this embodiment PBCs are used as a means to switch between different FC loops, other means such as switches may be used.

The FC loops 270–273 are built into the base module 100 and the add-on modules 130. A relation between the FC loops 270–273 and the modules will be described later.

As to the hard disk drives 130 of FIG. 1, a fewer number of them are shown in FIG. 2 for simplicity. These hard disk drives 130 are connected alternately to the FC loops 270, 271 and to FC loops 272, 273. In a normal state in which no failure is present, the PBCs 260–263 are connected to the FC loops 270–273, respectively and the controller 220 controls the FC loops 270, 271 and the controller 221 controls the FC loops 272, 273.

As an example suited for the above-described control method, a disk array system may be conceived in which the controllers 220, 221 distributively store data sent from the higher level device into a plurality of hard disk drives 130 to realize an improved throughput. In this disk array system, the controllers 220, 221 distributively store into logic units 285–287 data transferred from the higher level device and redundant data generated from the received data. This improves reliability of stored data. For example, if in the logic unit 285 one hard disk drive 130 fails, the data stored in the failed hard disk drive can be recovered from the data and redundant data contained in normal hard disk drives. Further, in this embodiment, if two controllers 220, 221 control the same logic unit, since data matching needs to be established between the two controllers, the data processing speed deteriorates. Therefore, in this embodiment it is assumed that the logic units to be controlled by each controller are predetermined. Information about which controller controls which logic unit is stored in the cache memories 230, 231.

When there is a trouble with one of the FC loops 270–273 or hard disk drives 130, the controllers 220, 221 cause the PBCs 260–263 to connect to the failover paths 280–283 so that they can use other FC loops than a malfunctioning FC loop that contains a failed component (hereafter referred to as redundant loops). In this embodiment, a unit in which the switching is made at one time is two FC loops, such as FC loops 270, 271 or FC loops 272, 273. It is also possible to switch one FC loop at a time.

In the event of a failure, a failure location is displayed on a screen of a control terminal connected to the controller 221. Using the control terminal, it is possible to isolate a failed hard disk drive 130 from the FC loops 270–273 or perform setting on the logic units. In this embodiment, the control terminal 290 and the storage system 150 are interconnected through a control terminal signal line 281. The control terminal signal line 281 may use a LAN cable, RS-232C or optical fiber. It is also possible to move a function of the control terminal 280 to the higher level device 210 and omit the control terminal 290.

Figure 3:
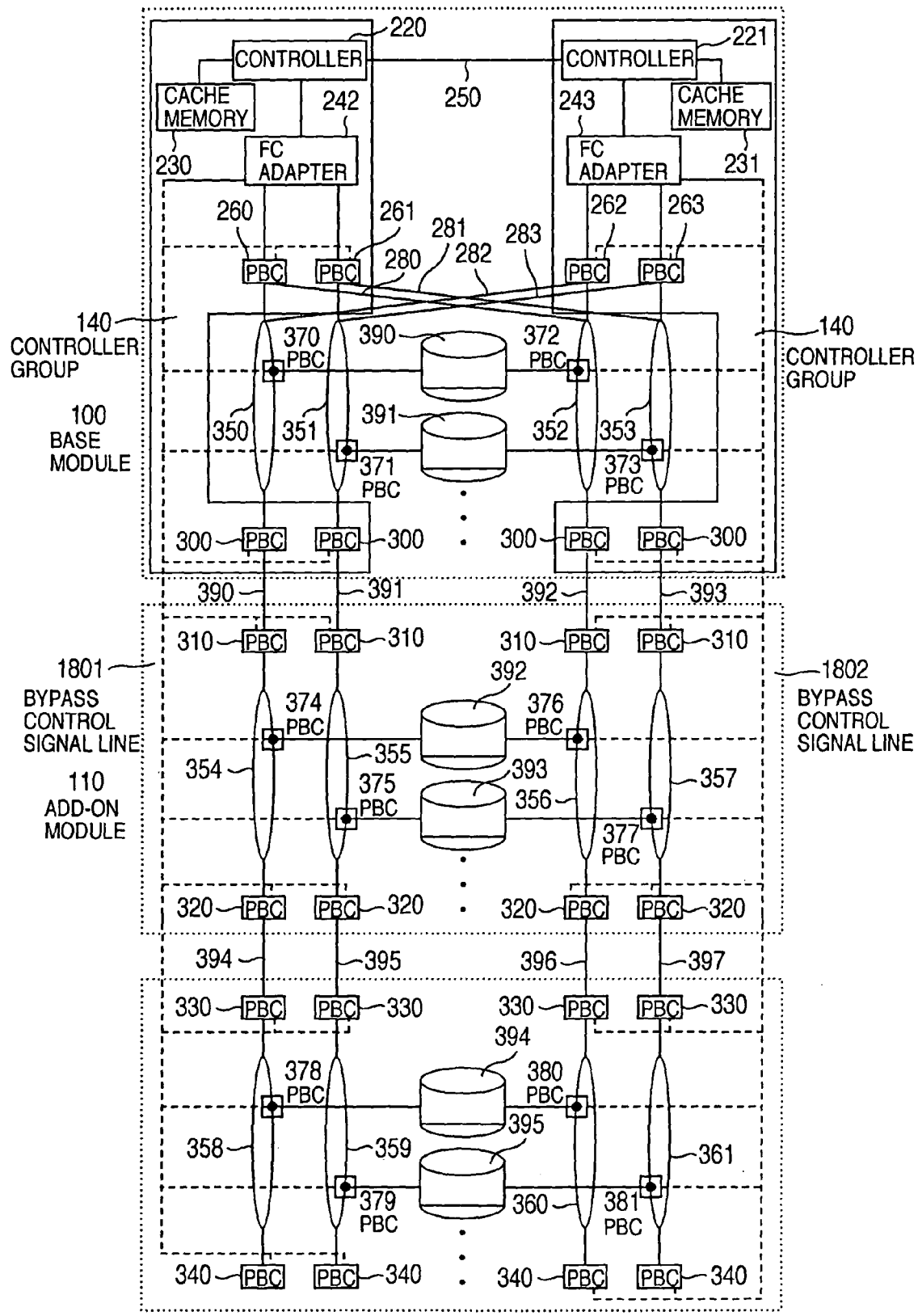
FIG. 3 illustrates details of the loop configuration in the conceptual diagram of FIG. 2.

FIG. 3 illustrates details of the FC loops of FIG. 2. In the following a correspondence between FIG. 3 and FIGS. 1 and 2 will be explained. As described above, the FC loops are each configured to span the base module and the add-on modules and comprise intra-module loops, PBCs and inter-module loops. The FC loop 270 of FIG. 2 comprises intra-module FC loops 350, 354, 358, inter-module PCBs 300, 310, 320, 330, 340, and intra-module PCBs 370, 374, 378. Similarly, the FC loop 271 corresponds to FC loops 351, 355, 359 of FIG. 3 and the FC loop 272 corresponds to FC loops 352, 356, 360 of FIG. 3.

The hard disk drives 390–395 are connected to FC loops 350–361 through intra-module PBCs 370–381. The hard disk drives 390, 392, 394 are connected to the FC loop 270 and the FC loop 272. The hard disk drives 391, 393, 395 are connected to the FC loop 271 and the FC loop 273.

A bypass control signal line 1801 is connected to each PBC and to an FC adapter 242. Similarly, a bypass control signal line 1802 is connected to each PCB and to an FC adapter 243. The controllers 220, 221 perform, via FC adapters 242, 243, a disconnection (bypass) operation by switching the PBCs connected to the bypass control signal lines 1801, 1802.

Figure 4A:
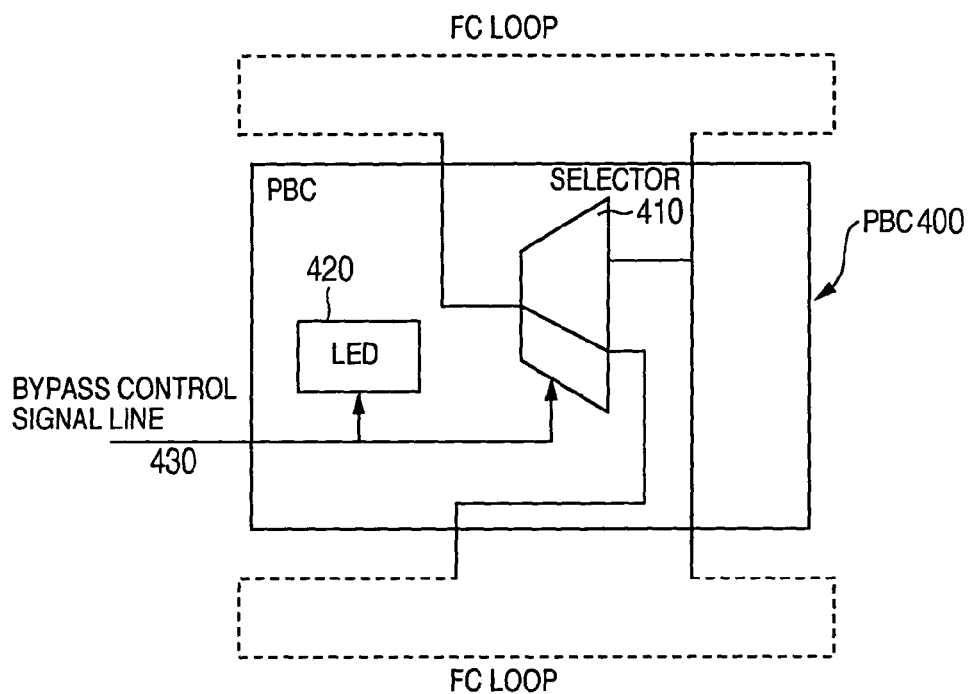
FIGS. 4A and 4B are schematic diagrams showing a configuration of a PCB (port bypass circuit).

FIG. 4 illustrates an example configuration of the PBC of this embodiment. A selector 410 in FIG. 4A bypasses hard disk drives and a controller associated with the FC loop of interest or a part of the FC loop. An LED 420 lights up when a bypass control signal line 430 is ON (bypass state), annunciating to the outside that the PBC is in a bypass state. The bypass control signal line 430 can also receive an input from control terminals or the like outside the storage system.

When an FC loop or hard disk drive fails, the controller sends a bypass command to the FC adapter to cause the associated PBC to bypass the FC loop to disconnect the failed component. Then, the controller enters a degenerate operation but can continue to perform normal processing.

Figure 4B:
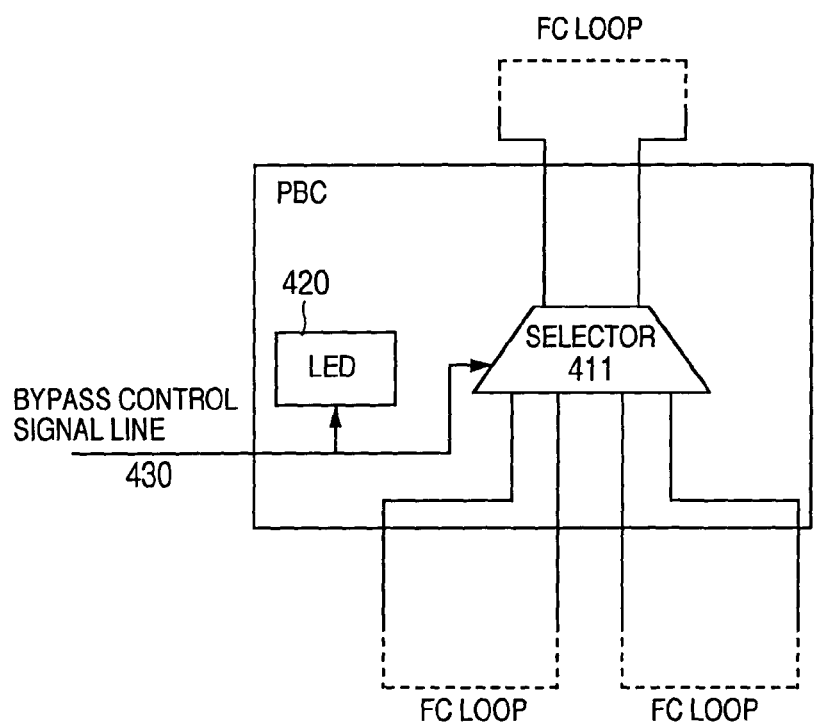

A PBC in FIG. 4B is used in PBCs 260–263 to switch between loops.

In the storage system of this embodiment, a SCSI-FCP (SCSI-3 Fiber Channel Protocol) is used for a data link layer of the fiber channel protocol in the FC loop.

When this SCSI-FCP is used, the storage system can specify to each hard disk drive a bypass control signal line 430 ON/OFF output by using a parameter list in an FCP command, SCSI Send Diagnostics, issued from the controller as an initiator of the SCSI-FCP to each hard disk drive as a target.

This allows the controllers 220, 221 to control the bypass operation of PBCs. Similarly, the controllers can know, through each hard disk drive, the present bypass state of each PBC by using an FCP command, SCSI Receive Diagnostic Results.

Each of the PBCs provided on the FC loop, as shown in FIG. 4, includes a selector 410 for bypassing the FC loop, a bypass control signal line 430 input from outside to control the switching of the selector 410, and an indicator lamp 420 such as LED to indicate to the outside that the PBC is in a switched bypass state.

Let us consider a case where a hard disk drive 392 is to be bypassed. The controller 220 issues a bypass command. The FC adapter 242, upon receiving the command, causes through the bypass control signal line 1801 the selector 410 of the PBC 374 to bypass the hard disk drive 392 from the FC loop 354. Because the PBC 374 is in a bypass state, the LED 420 lights up.

The storage system of this embodiment is not limited to a configuration using such communication media as optical fibers and conductors for the FC loop, but also includes configurations in which FC loops are formed as printed wiring patterns on an equipped board.

Now, how the storage system locates a failure while performing normal processing such as reading and writing operations requested by a higher level device will be described by referring to the drawings.

Figure 5:
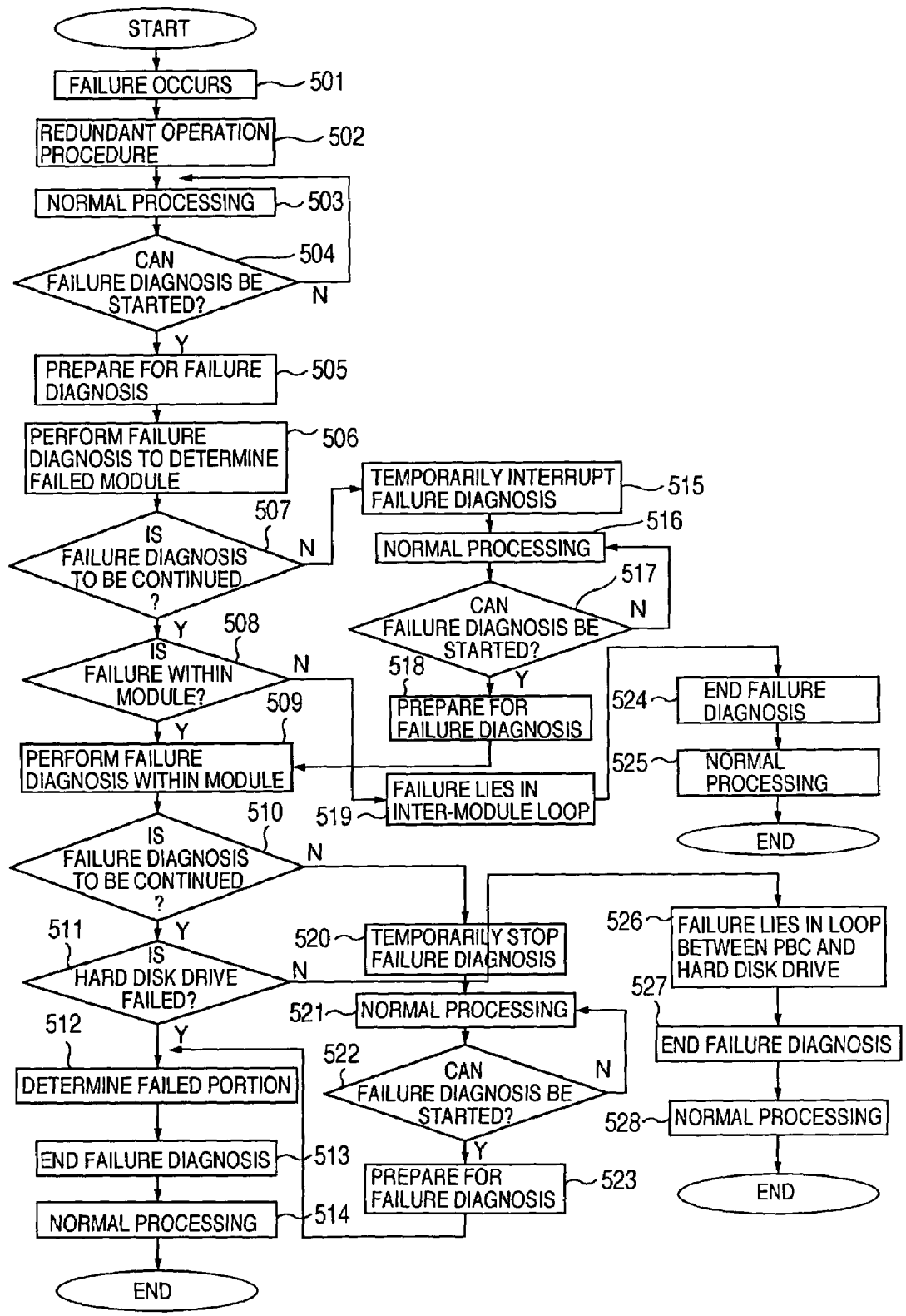
FIG. 5 is a flow chart showing an overall process of detecting a failure.

FIG. 5 is a flow chart showing an overall sequence of a failure diagnosis. When a malfunction occurs with an FC loop or hard disk drive (step 501), the controller switches to a redundant loop (step 502). After switching to the redundant loop, the controller resumes read/write operations requested by the higher level device 210 (step 503). In the case of a write operation, if there is a fault in the storage system, the storage system receives a write request from the higher level device and stores it in the cache memory, at which time the controller notifies the higher level device of a completion of the write operation.

In the case of a read operation, if a failure occurs with the storage system and the storage system receives a read request from the higher level device, the controller recovers data using redundant data, switches from the failed loop to a redundant loop and then checks if a condition for executing the failure diagnosis is met. If the predetermined condition is met (step 504), the controller accumulates the request from the higher level device in the cache memory and then switches back from the redundant loop to the malfunctioning FC loop (step 505). After the loop switching, the controller sequentially disconnects modules to determine which module has failed. This operation is repeated until the malfunctioning module is determined (step 506).

When it determines the failed module, the controller notifies it to the control terminal. The control terminal displays a configuration of FIG. 2 or FIG. 3 on its screen. The controller can either stop the failure diagnosis temporarily or continue the processing. A maintenance staff may set beforehand whether or not to continue the failure diagnosis or set a certain condition for continuing the failure diagnosis (step 507).

If the controller temporarily stops the failure diagnosis, it switches from the failed loop to a redundant loop to execute the normal processing (step 515). After switching to the redundant loop, the controller performs processing requested by the higher level device (step 516). If a predetermined condition for the failure diagnosis is satisfied, the controller performs the failure diagnosis again, as in step 504 (step 517).

After the failure diagnosis for each module is finished and it is found that a failure is an intra-module failure, intra-module failure diagnosis is executed. Similarly, when the temporarily interrupted failure diagnosis is to be resumed, the controller also performs the intra-module failure diagnosis (step 509). The intra-module failure may be caused by a failed hard disk drive and a malfunctioning FC loop. If, on the other hand, the trouble lies with an inter-module loop, the failure diagnosis is ended (step 524) and the normal processing is performed (step 525).

The intra-module failure diagnosis consists in switching the FC loop by a PBC in each hard disk drive to perform the failure diagnosis. First, the controller causes all the PBCs provided in the hard disk drives in the module to bypass the FC loop. Then, the controller connects only one PBC provided in a hard disk drive to locate the failure. This operation is repeated until a PBC connected to the failed component is determined.

At this point in time, the trouble is found to be caused by either a hard disk drive or an FC loop between the PBC and the hard disk drive. Since one of these two components is faulty, the controller switches from the failed loop to a redundant loop to check if the failure is a hard disk drive failure. The controller can determine if the cause of the trouble is the hard disk drive, by checking the hard disk drive from the redundant loop (steps 511, 512). If the trouble is found not caused by the hard disk drive, it then follows that the FC loop from the PBC to the hard disk drive is faulty.

Once the intra-module failure is determined to this level, the controller notifies the failed component to the control terminal. The control terminal displays the failed component on its screen. Further, the controller finishes the failure diagnosis and returns to normal processing (steps 514, 528).

While in this embodiment the temporary interruption of the failure diagnosis is done after the module failure diagnosis is completed or after the intra-module failure diagnosis is finished, this invention is not limited to this method. For example, it is possible to interrupt the module failure diagnosis when the failure diagnosis is finished with one of the modules. Or when it becomes difficult to accumulate processing requests from the higher level device in the cache memory, the failure diagnosis may be interrupted to perform normal processing, after which the failure diagnosis can be resumed. Further, if the failure diagnosis does not finish within a response time determined by the higher level device for the storage system, the controller temporarily stops the failure diagnosis and resumes the processing requested by the higher level device. After this, the controller resumes the failure diagnosis.

FIG. 6 to FIG. 11 show details of the overall flow chart of FIG. 5. Here it is assumed that a failed component is a hard disk drive connected to the FC loop 270 or FC loop 271.

Figure 6:
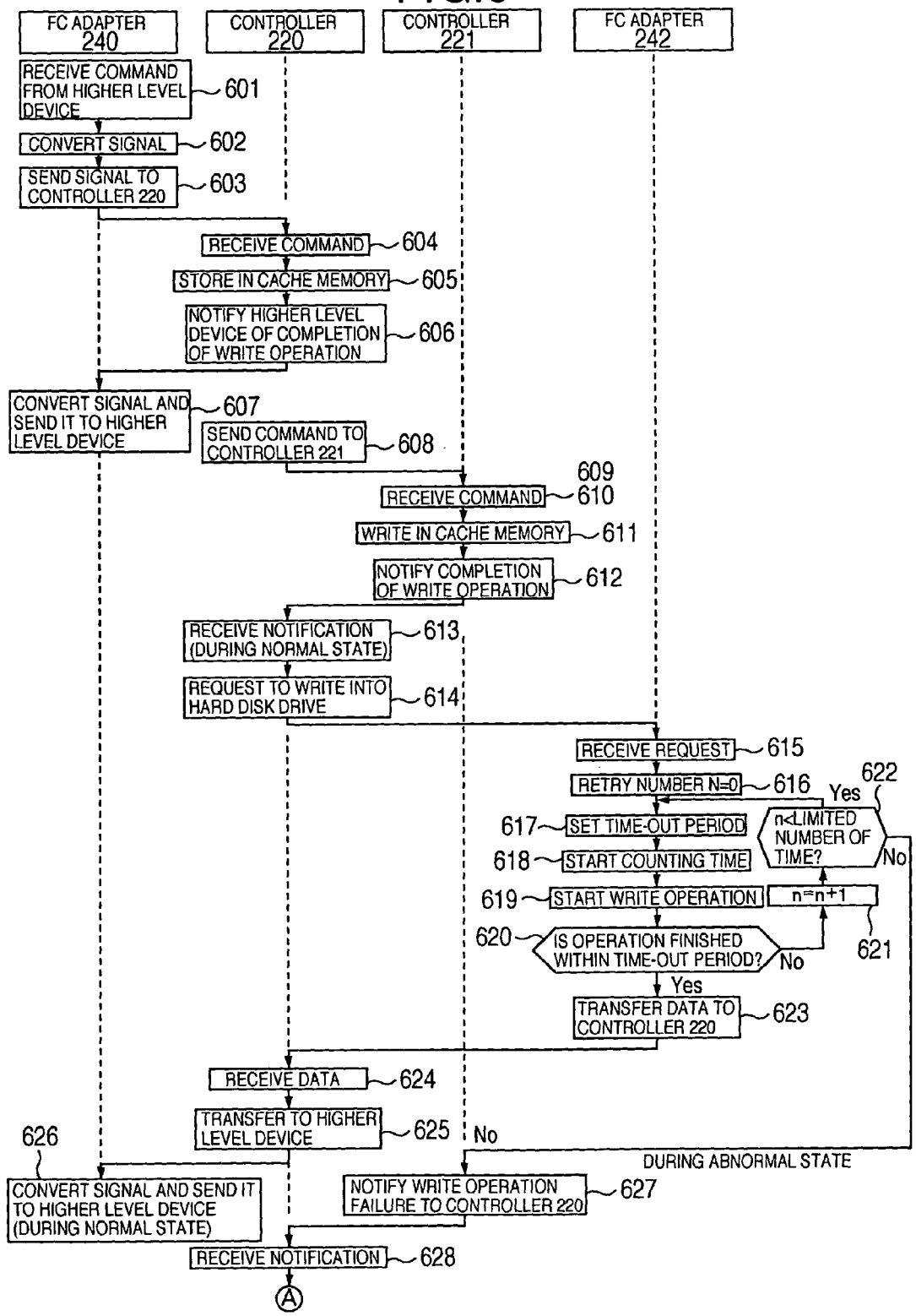
FIG. 6 illustrates a part of the flow chart of FIG. 5.

FIG. 6 is a flow chart showing a sequence of steps performed by the storage system in response to a request from a higher level device, ranging from normal processing to a point in time when a failure occurs. A write or read command sent from the higher level device is transferred to the controller 220 through the FC adapter 240 connected between the higher level device and the controller (step 604). The controller 220 interprets the command to see if it is a write command or a read command. The controller checks a cache memory 230 to see if data requested by the command falls in a range of data to be processed by the local controller. The reason that the controller 220 checks the cache memory 230 is that a logic unit assigned to the hard disk drive is processed by a predetermined controller for faster processing. Which controller processes which logic unit is determined beforehand and a correspondence table is stored in the cache memories 230, 231.

When a logic unit used for the write operation is to be processed by the local controller, the controller 220 stores write data in the cache memory 230 and then notifies the higher level device of the completion of the write operation (step 606). The write data contained in the cache memory 230 is also written into the cache memory 231 for duplication. The controller 220 sends the write data to the controller 221 through the intercontroller communication line 250. The controller 221 receives the data, writes it into the cache memory 231, and then notifies the controller 220 of the completion of the write operation. After notifying the higher level device of the completion of the write operation, the write data is written into the hard disk drive. The reason that the data from the higher level device is doubly stored in the two cache memories is to improve reliability of the storage system. To increase the speed of processing, the controller 220 may not write the data into the second cache memory.

When there is no trouble with the FC loop, the data is written into the hard disk drive through the FC adapter 242 on the hard disk drive side.

However, if the controller receives no response within a predetermined time of its issuing a write command to the hard disk drive, the controller re-issues the write command (step 619). When the number of times that the command is issued exceeds a predetermined count, the controller decides that a failure has occurred (step 622). After it has determined that a failure has occurred, the controller 220 enters into failure diagnosis.

The read operation is performed as follows. When it receives a read request from a higher level device but the target data does not exist in the cache memory 230, the controller 220 issues a read command to the hard disk drive to read the data. As in the case with the write operation, if there is no response from the hard disk drive within a predetermined time of the read command being issued, this session times out. The controller re-issues the read command and when the number of times that the read command is issued exceeds a predetermined count, the controller decides that a failure has occurred. Unlike the write operation, the read operation is not completed until the target data is sent to the higher level device. After it decides that a failure has occurred, the controller 220 attempts to recover the target data from other normally operational hard disk drives for transfer to the higher level device. If the data cannot be recovered from other normal hard disk drives, the FC loop is switched to a redundant loop. If the controller 220 is still unable to calculate or read the data even by using the redundant loop, it notifies the higher level device of a read operation failure. Then the controller 220 proceeds to the failure diagnosis.

Figure 7:
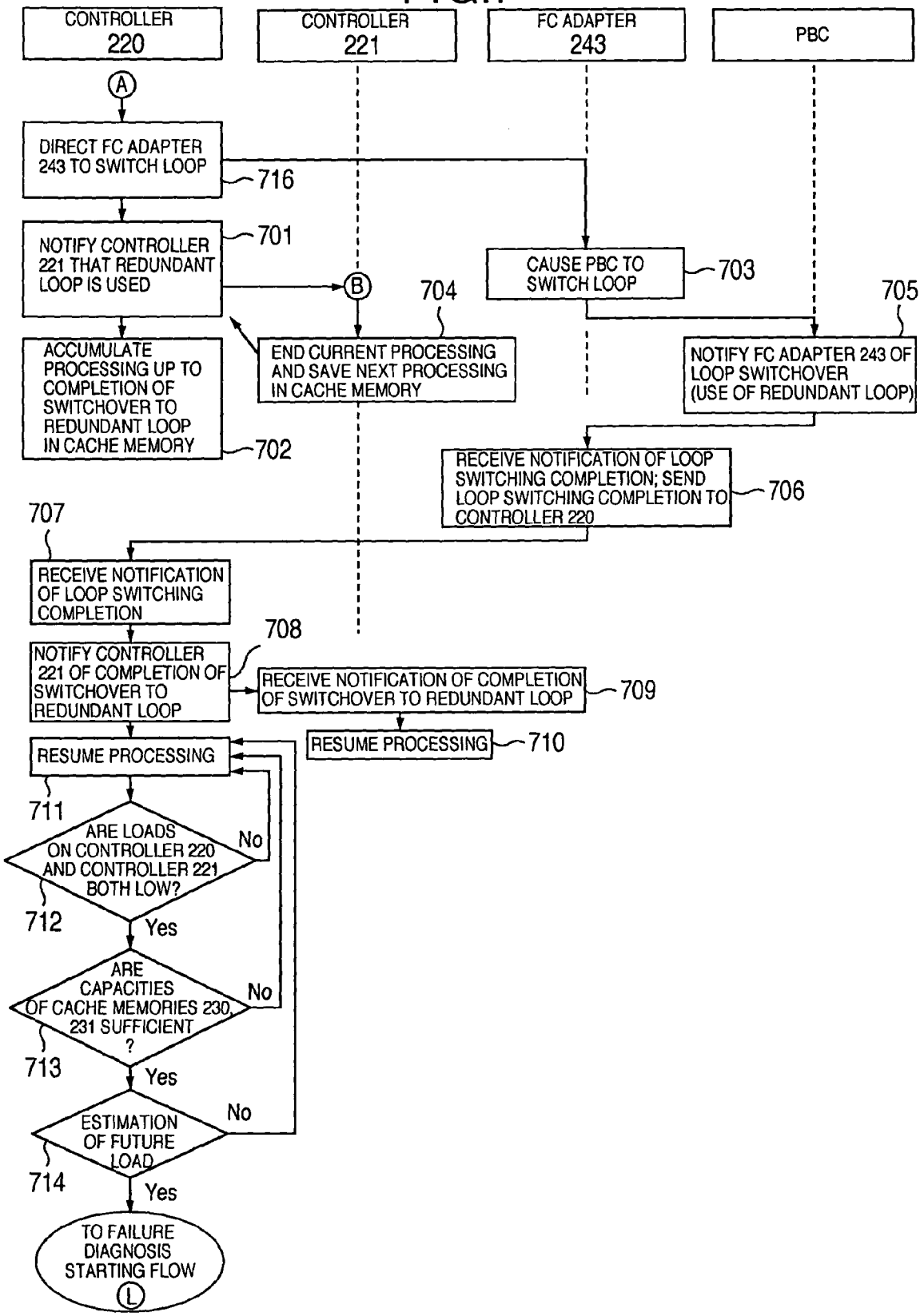
FIG. 7 is a continuation of the flow chart of FIG. 5.

FIG. 7 is a flow chart showing a sequence of steps up to the start of the failure diagnosis, as performed by the storage system using redundant loops while executing read and write operations requested by a higher level device. These steps correspond to step 502 through step 504 of FIG. 5. To switch from a malfunctioning loop to a redundant loop, the controller 220 requests the other controller 221 through the intercontroller communication line 250 to make the redundant loop available for use. Upon receipt of the request, the controller 221, after completion of the current processing, accumulates the next processing temporarily in the cache memory 231 and notifies the controller 220 that the switchover is ready (step 704). On receiving the notification, the controller 220 issues a FC loop switchover command to the FC adapter so that the redundant loop can be used (step 716). The FC adapter 243, upon receiving the command, causes the PBCs 260, 261 to switch over to the FC loop 272 and FC loop 273 by using the failover paths 280, 281. With the switchover complete, the FC adapter 243 notifies the controller 220 of the completion of the switchover (step 706). The controller 220, upon receiving the switchover completion notification (step 707), notifies the controller 221 of the completion of the loop switchover (step 708). After receiving the switchover completion notification (step 709), the controller 221 resumes processing accumulated in the cache memory 231. Then, the controller 220 also resumes processing requested by the higher level device (step 711). This state is a degenerate operation using the redundant loops and therefore the communication bandwidth is reduced in half and performance degraded compared when two FC loops are used.

During the degenerate operation, the controller 220 checks if a predetermined condition is satisfied in order to locate a failed component. In this embodiment, if the controller 220 decides that loads on both controllers 220 and 221 are low (step 712), that there are sufficient usable capacities in the cache memories 230 and 231 (step 713), and that, from a past load history, there is little chance of the loads increasing from now on (step 714), the controller 220 starts locating the failed component. The conditions under which the failure diagnosis is started are not limited to the above. For example, the failure diagnosis may be initiated if any one of the above conditions is met.

Figure 8:
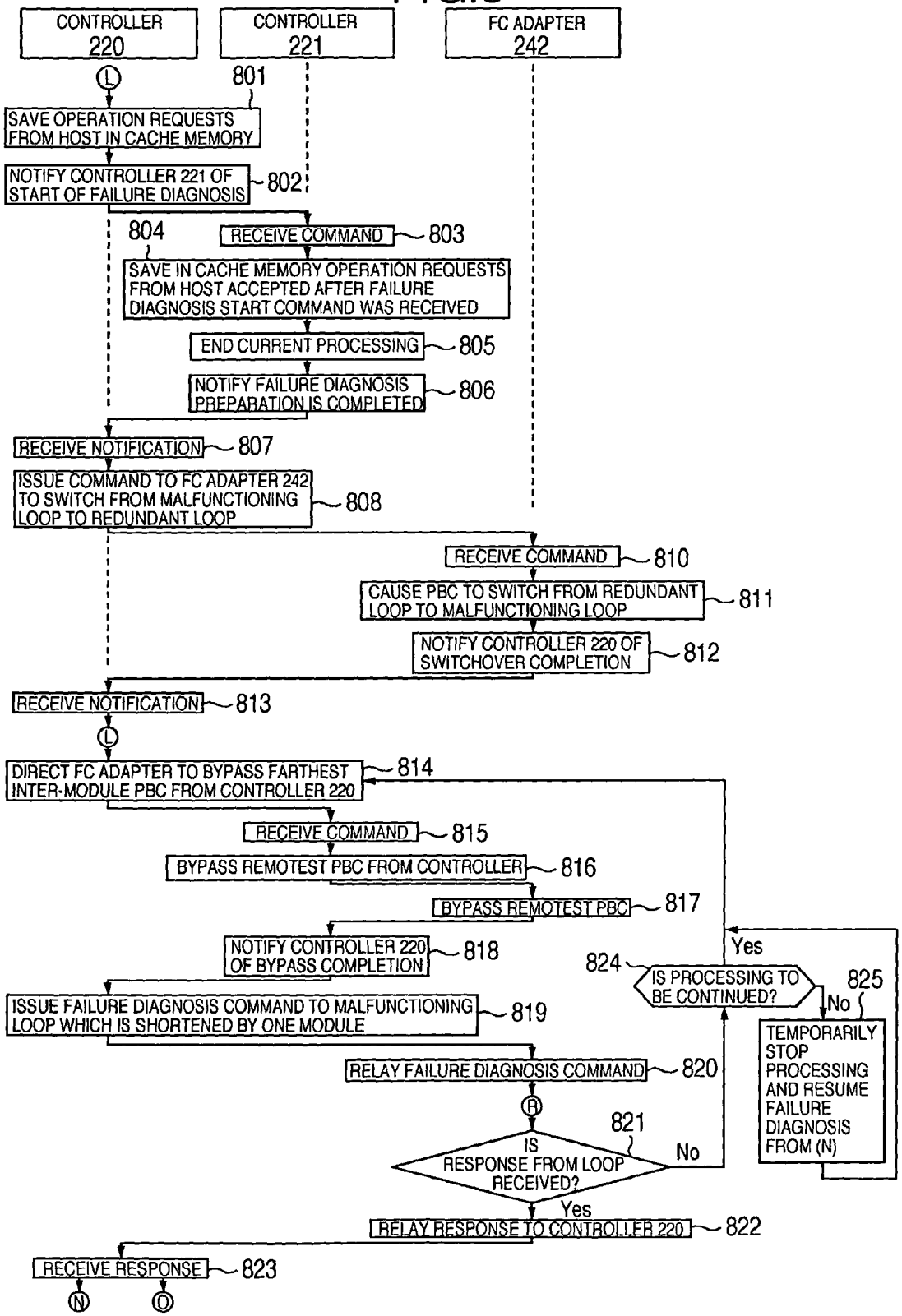
FIG. 8 is a continuation of the flow chart of FIG. 5.

FIG. 8 is a flow chart showing a sequence of steps ranging from a preparation of the module failure diagnosis to its execution. These steps correspond to step 505 and step 506. The failure diagnosis is performed in a way that does not adversely affect the read and write operations requested by a higher level device. For this purpose, the failure diagnosis is executed intermittently in multiple steps during the normal processing. The controller 220 informs the other controller 221 of the initiation of the failure diagnosis. The controller 221, upon receipt of the notification, ends the current processing requested by the higher level device and then accumulates the next processing in the cache memory 231. The reason that the processing of the controller 221 on the failed loop is temporarily interrupted is to speed up the failure diagnosis. It is also possible to execute the failure diagnosis while letting the controller 221 perform its own processing. In that case, however, although the controller 221 can execute the normal processing, the time it takes for the controller 220 to complete the failure diagnosis becomes greater than when the controller 221 is stopped.

The controller 220, after confirming the stop of the normal processing (step 807), issues a command to the FC adapter 243 to switchover from a redundant loop to the failed loop (step 808). Upon receipt of the command, the FC adapter 243 causes the PBCs 260, 261 to switch over from the redundant loop to the failed loop (step 811).

After the switchover from the redundant loop to the failed loop is completed, the controller 220 disconnects a module farthest from the controller in order to determine which module is failed. While in this embodiment the module disconnection begins with the most remote module, it is possible to disconnect the nearest module first to determine which module has failed.

The controller 220 issues a command to the FC adapter 242 to bypass the most remote module (step 814). The FC adapter 242 causes the PBC 330 to bypass the module. After the module is bypassed, the controller 220 issues a failure diagnosing command to the shortened FC loop to check if the shortened FC loop is normal (step 819). As one example of the failure diagnosing command, a fiber channel LIP (Loop Initialization Primitive) may be used. As with other commands used during the normal operation, the failure diagnosing command may be given a retry number and a time-out setting. If, after the failure diagnosing command has been issued, a response is received from the FC loop, this indicates that a failure exists in the previously bypassed module or in an inter-module FC loop.

If no response is received from the shortened FC loop after the failure diagnosing command is issued, the FC loop should further be reduced. Thus, the controller 220 issues a command to the FC adapter 242 to further shorten the FC loop. The FC adapter 242 bypasses the inter-module FC loop by the PBC 320. Then, the controller 220 issues a failure diagnosing command and waits for a response. The controller 220 continues shortening the FC loop until it gets a response. After it gets a response, the controller 220 either continues the failure diagnosis or, to prevent a time-out of the processing requested by the higher level device, temporarily stops the failure diagnosis.

Figure 9:
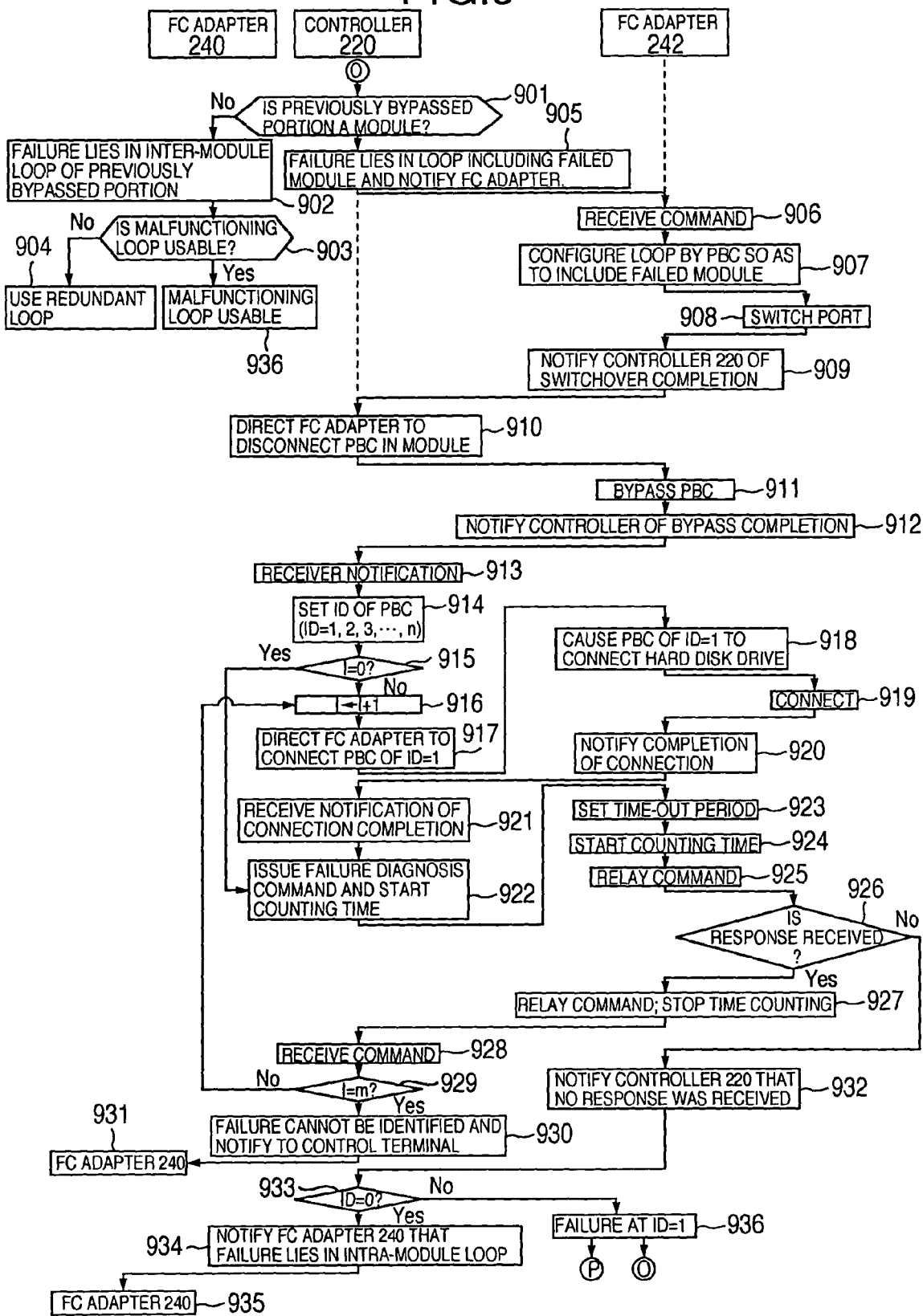
FIG. 9 is a continuation of the flow chart of FIG. 5.

FIG. 9 is a flow chart representing a sequence of steps performed by the intra-module failure diagnosis. These steps correspond to step 509 of FIG. 5. The processing varies depending on whether the failed component lies in an inter-module loop or in a module itself (step 901). When a failure exists in the inter-module loop, the controller 220 does not need to continue the failure diagnosis. The controller 220 checks if the malfunctioning loop with the failed inter-module loop can be used (step 903). If hard disk drives connected to that part of the FC loop which is farther than the failed component from the controller 220 are not used, the controller 220 can still use the malfunctioning loop without switching over to a redundant loop, by disconnecting the failed inter-module loop. If the controller 220 cannot use the malfunctioning loop, it must switch over to a redundant loop (step 904).

Returning to step 901, if the failed component lies in the module, the controller 220 causes the PBC to disconnect all the hard disk drives in the malfunctioning module to determine the failed component in the module. In this condition, the controller 220 issues a failure diagnosing command (step 922). If no response to the failure diagnosing command is received, then it is decided that the failure exists in the FC loop in the module (step 934). On the other hand, if no failure is found when the controller 220 causes the PBCs to bypass all the hard disk drives, then the failure lies with the hard disk drives.

The controller 220 connects one hard disk drive at a time successively by switching the PBC in the module (step 918). When a PBC is connected to the failed component and a response to the failure diagnosing command issued by the controller 220 is not returned, then the failure lies with the hard disk drive or the FC loop between the PBC and the hard disk drive.

Figure 11:
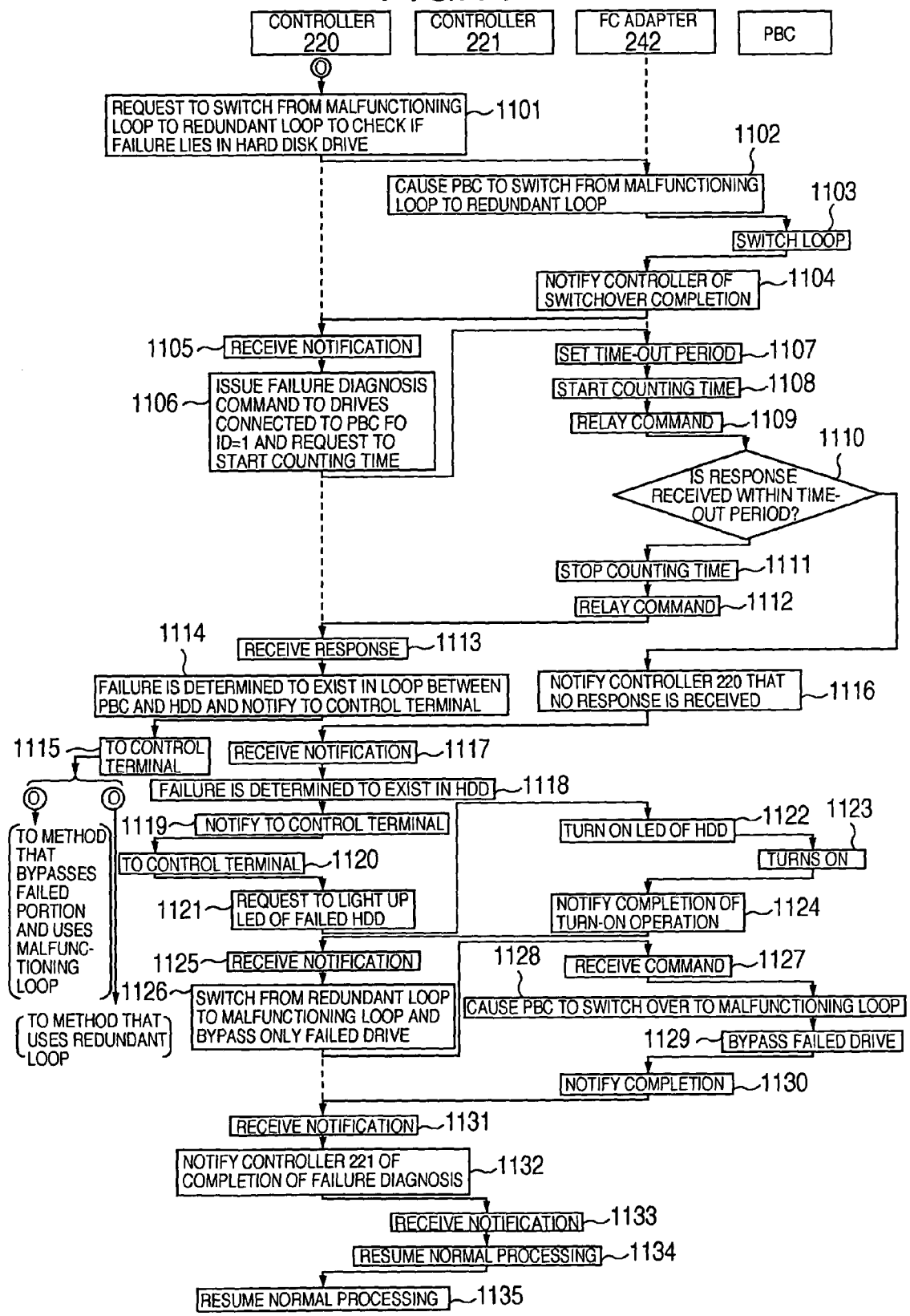
FIG. 11 is a continuation of the flow chart of FIG. 5.

FIG. 11 is a flow chart showing a sequence of steps performed by the controller when it is found that a failure has occurred with a hard disk drive. These steps correspond to step 512 to step 514 of FIG. 5. To check if the failure exists with a hard disk drive, the controller 220 switches over from the malfunctioning loop to a redundant loop (step 1101). After switching over to the redundant loop, the controller 220 issues a failure diagnosing command (step 1106). If in the redundant loop there is a response to the failure diagnosing command, it can be determined that the failure exists in a loop between the PBC and the hard disk drive (step 1114). Then, it is possible to either use the malfunctioning loop by bypassing the failed component or use a redundant loop to perform normal processing.

If, on the other hand, in the redundant loop a response to the failure diagnosing command is not received at step 1110, it is decided that the failure exists in the hard disk drive. Then the controller 220 lights up an indicator lamp 160 of the failed hard disk drive to inform it to a maintenance staff (step 1123). With the indicator lamp 160 of the failed hard disk drive turned on, the maintenance staff can easily identify the failed hard disk drive. Further, the control terminal 280 displays an occurrence of the failure on the screen (step 1120).

With the failure diagnosis completed, a return to the normal processing is initiated. To end the failure diagnosis, the controller 220 notifies the controller 221 of the completion of the failure diagnosis (step 1132). Upon reception of the completion notification, the controller 221 resumes the processing accumulated in the cache memory 231 (step 1134). After the resumption of the normal processing by the controller 221, the controller 220 also resumes the accumulated processing (step 1135). In the case where the controller 220 has interrupted the failure diagnosis in multiple steps, the completion of each failure diagnosing session is notified to the controller 221 as when terminating the failure diagnosis. The controller 220, after confirming the start of the normal processing, enters into the normal processing. In the case of the interrupted sessions, however, it is necessary to resume the failure diagnosis. By monitoring the loads of the controllers 220 and 221, the available capacities of the cache memories 230 and 231 and the estimated future load situation, the controller 220 starts the failure diagnosis again under a predetermined condition.

By executing the failure diagnosis in multiple steps, the controller 220 can significantly reduce the time it takes to complete one session of the failure diagnosis, thus making it possible to execute the failure diagnosis without adversely affecting the normal processing requested by a higher level device. Further, by notifying details of the failed component to the control terminal, the maintenance staff can replace the failed component swiftly and correctly.

Figure 10:
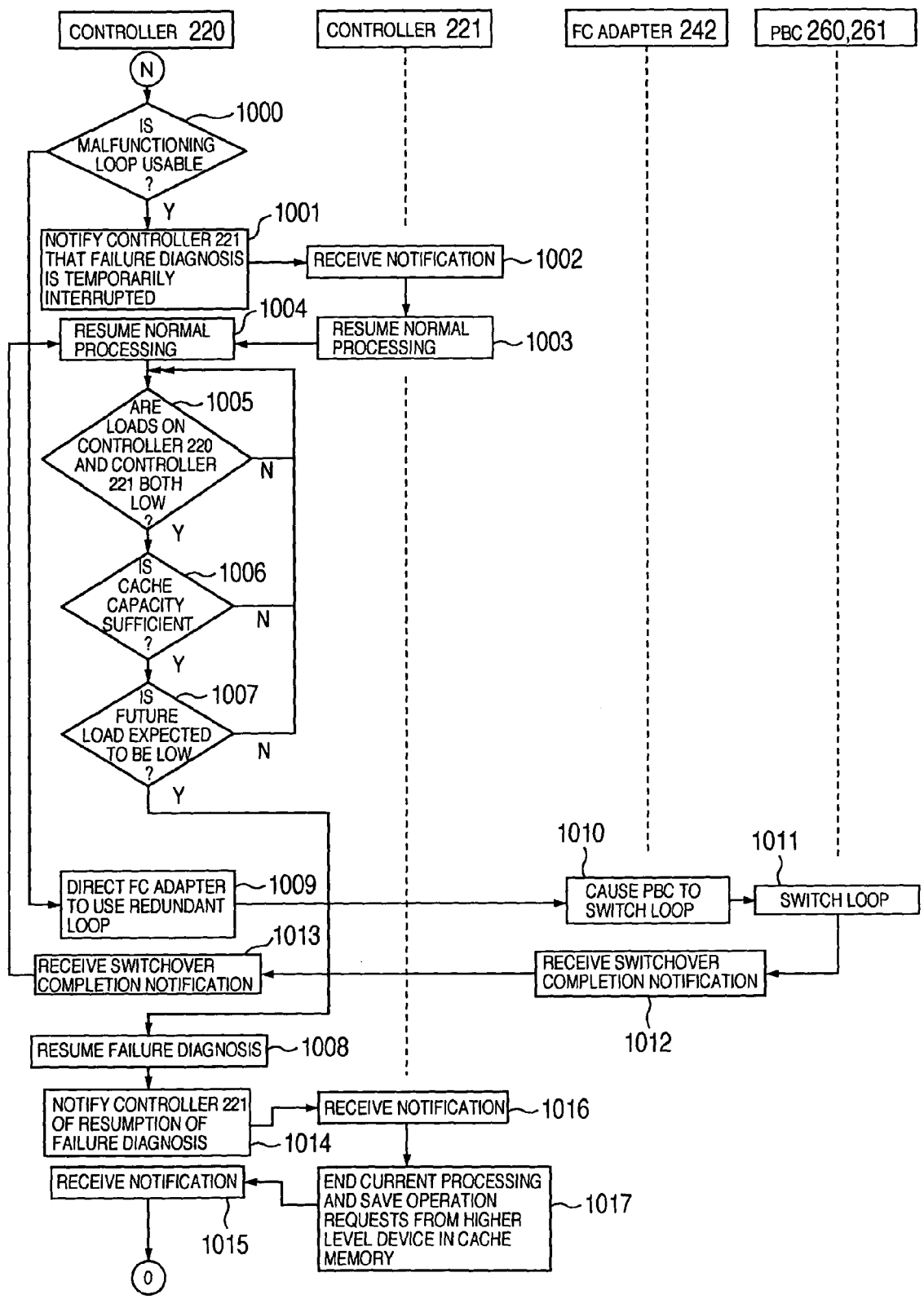
FIG. 10 is a continuation of the flow chart of FIG. 5.

FIG. 10 illustrates a sequence of steps from interrupting the failure diagnosis to resuming the same processing. The controller 220 can interrupt the failure diagnosis at step 823 or step 825. Alternatively, if a response to the read or write request from a higher level device is not produced within a time limit set by the higher level device, the controller 220 can temporarily stop the failure diagnosis. FIG. 10 corresponds to step 515 through step 518 of FIG. 5. The controller 220 stores an interrupted point in the failure diagnosis into the cache memory. Information on the interrupted point stored in the cache memory is used when resuming the failure diagnosis. With the interrupted point information stored in the cache memory, if it is found that the malfunctioning loop can still be used, the controller 220 uses the malfunctioning FC loop (step 1000). After the controller 220 has notified the resumption of the normal processing to the controller 221 (step 1001), the controller 220 and the controller 221 perform the normal processing. Then, when a predetermined condition for executing the failure diagnosis is met, the controller 220 resumes the failure diagnosis (steps 1005–1008). To resume the failure diagnosis, the controller 220 notifies the resumption of the failure diagnosis to the controller 221 (step 1014). Upon receipt of the notification, the controller 221, after finishing the current processing, accumulates the processing requests from a higher level device in the cache memory (step 1017). Then, the controller 220 reads the information on the interrupted failure diagnosis from the cache memory and resumes the failure diagnosis.

While in this embodiment the bypass control signal lines 1801, 1802 are provided for the controllers to bypass the hard disk drives and FC loops, it is also possible to have these bypass control signal lines included in the FC loops.

This embodiment offers an advantage of being able to execute the failure diagnosis on the storage system within a time-out period set by a higher level device without adversely affecting the normal processing such as read and write operations requested by the higher level device.

Further, this embodiment offers an advantage of being able to minimize, in the event of a failure, degradations in performance and reliability of the storage system equipped with a communication path.

Further, this embodiment offers an advantage of being able to swiftly, easily and correctly identify a failed component and perform a recovery operation in the storage system equipped with a communication path.

Further, this embodiment offers an advantage of being able to reliably perform recovery operations in the storage system with multiple communication path in the event of multiple failures occurring in a plurality of communication path.

(Second Embodiment)

Figure 12:
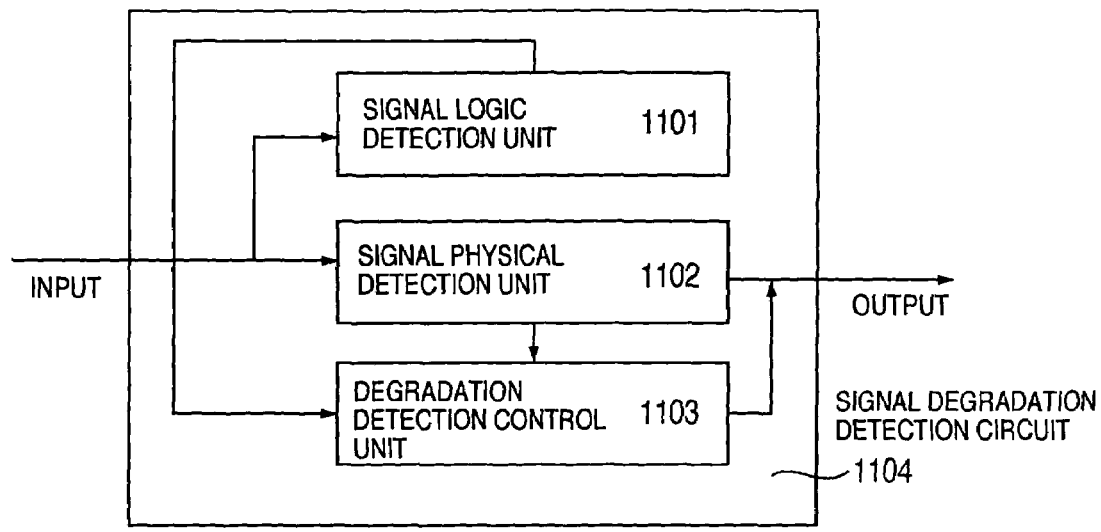
FIG. 12 is a schematic diagram showing a signal degradation detection circuit.

A signal degradation detection circuit 1104 may be provided in an FC loop to monitor a possible degradation of a signal in the FC loop before a failure occurs. FIG. 12 shows a configuration of the signal degradation detection circuit 1104. A signal physical detection unit 1102 monitors an amplitude of a physical signal in the FC loop. A signal logic detection unit 1101 monitors a logic type of the signal. As an example of a fiber channel protocol, the signal logic detection unit 1101 can detect anomalies in sequence and frame. When a signal degradation becomes worse than a predetermined level, the signal physical detection unit 1102 or signal logic detection unit 1101 informs it to a degradation detection control unit 1103. The degradation detection control unit 1103 notifies the signal degradation to the controller through the FC loop. Alternatively, the degradation detection control unit 1103 may use a signal line described later.

Figure 13:
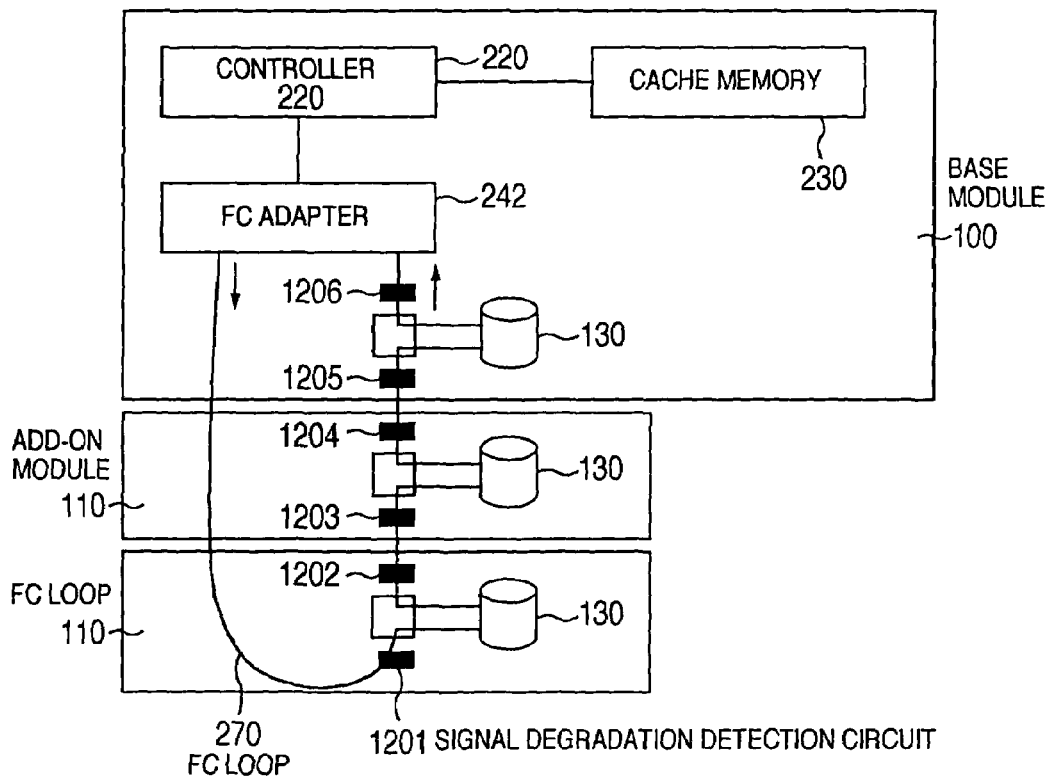
FIG. 13 is a schematic diagram showing the signal degradation detection circuit built into each module of the storage system.

FIG. 13 illustrates a configuration of a part of the storage system when the signal degradation detection circuit of FIG. 12 is built into each module of the storage system. The modules are each provided with two of the signal degradation detection circuits 1201–1206. While in this embodiment two signal degradation detection circuits are incorporated into each module, they may be provided at each of the inlet and outlet of the FC loop and installed along with the inter-module PBC circuit. In this embodiment, we take up an example case of a unidirectional signal as in an FC loop.

Figure 14:
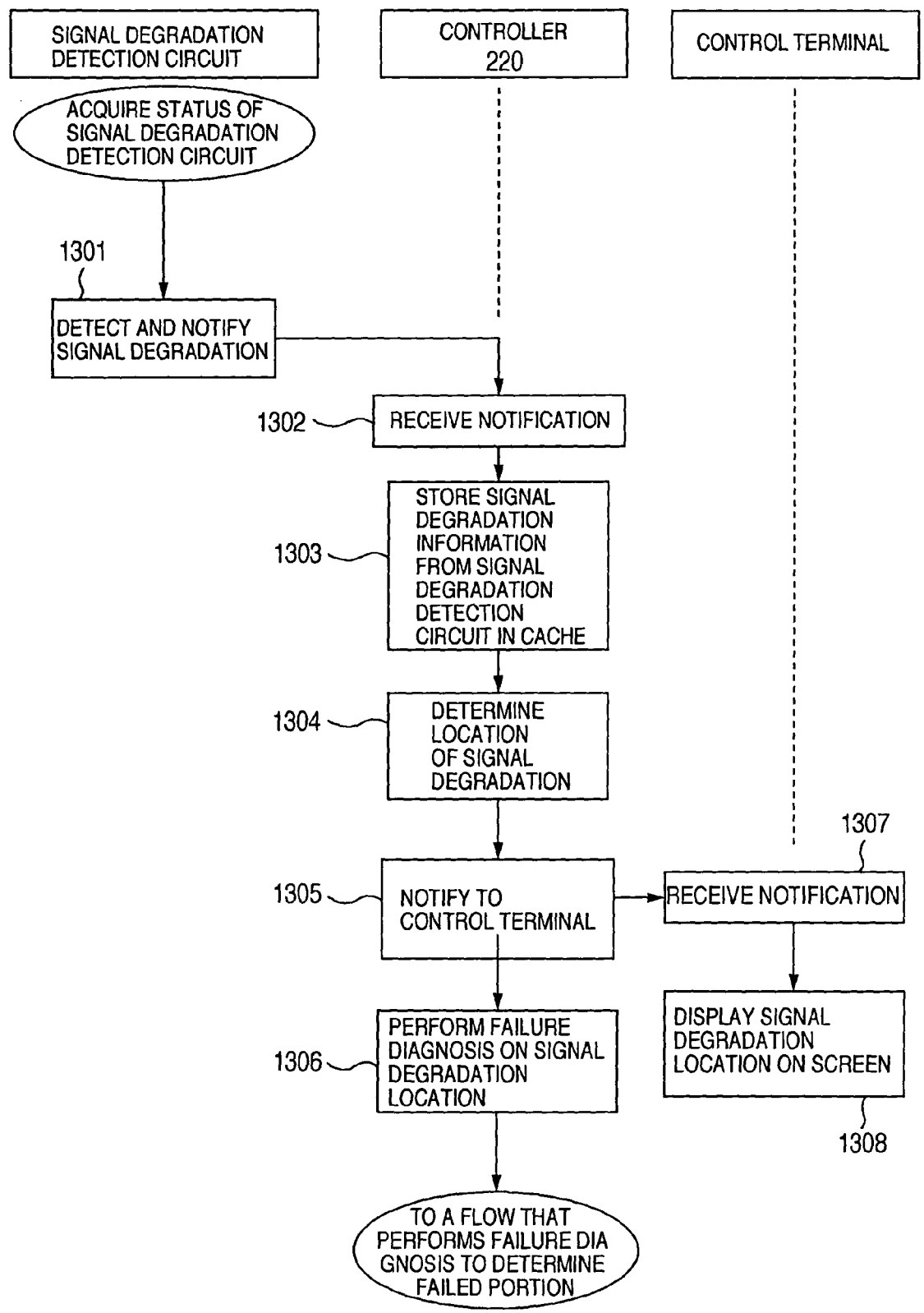
FIG. 14 is a flow chart showing steps from a detection of signal degradations to an execution of a failure diagnosis.

FIG. 14 is a flow chart showing a sequence of steps beginning with the signal degradation detection circuit of FIG. 13 detecting a signal degradation and ending with the controller executing a failure diagnosis. When the signal degradation detection circuit detects a signal degradation, it informs the signal degradation to the controller (step 1301). The controller 220 stores signal degradation information sent from the signal degradation detection circuit into the cache memory. In the case of the FC loop, the signal is a unidirectional signal, so in the event of a failure in an upstream part of the FC loop, the signal in the FC loop downstream of the failure will become abnormal. Thus, the location where the signal degradation occurred is situated between a signal degradation detection circuit that finds the signal to be normal and a signal degradation detection circuit that finds the signal to be abnormal (step 1304). The information that the controller 220 stores in its cache memory includes a signal degradation detection circuit number, a location of that signal degradation detection circuit and a state of the signal. As shown in FIG. 14, the controller 220 notifies the control terminal of the signal degraded location (step 1305). The control terminal then displays the signal degraded location on its screen (step 1308) so that a maintenance staff can check the indicated location. The maintenance staff can also replace a deteriorated component before it fails.

Suppose in FIG. 13 that the signal degradation detection circuit 1203 is normal and that the signal degradation detection circuit 1204 has detected a signal degradation. The location where the signal is degraded is determined to be upstream of the signal degradation detection circuit 1204 and downstream of the signal degradation detection circuit 1203. Further, since the signal degradation detection circuits 1203, 1204 are installed at the inlet and outlet of the module FC loop, the signal degraded location lies in the module.

Further, if the signal degradation detection circuit 1202 is normal but the signal degradation detection circuit 1203 has detected a signal degradation, the signal degraded point is situated upstream of the signal degradation detection circuit 1203 and downstream of the signal degradation detection circuit 1202. Thus, the faulty point lies in the inter-module FC loop.

It is very likely that signal degraded point will cause a failure. Therefore, when a failure occurs in the FC loop that has a degraded signal, the failure diagnosis begins with the module that has the degraded signal in order to reduce the time taken by the failure diagnosis.

Figure 15:
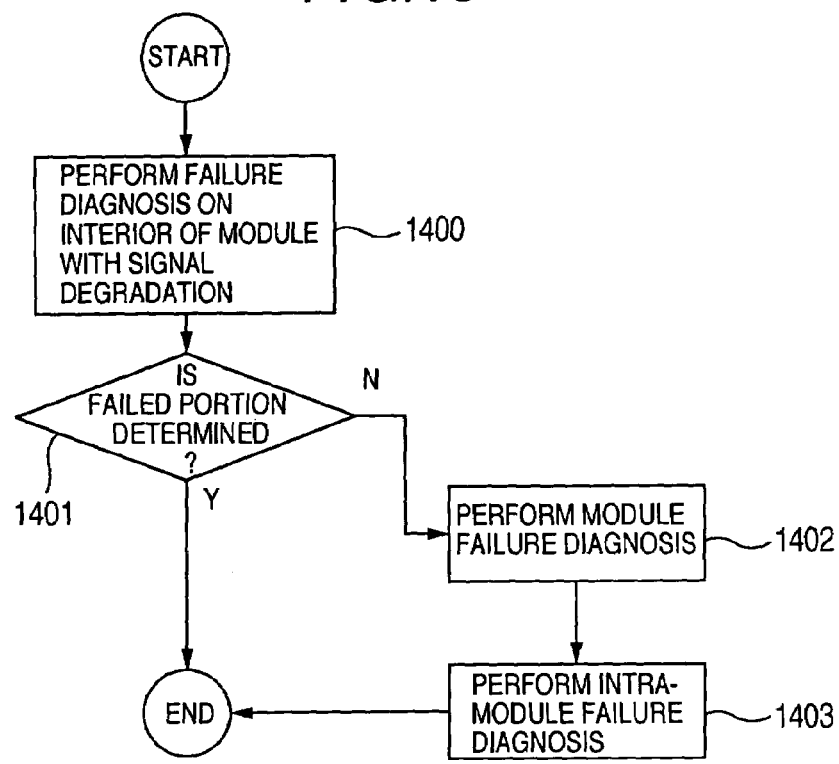
FIG. 15 is a flow chart showing outline processing of detecting a failure in a module that has a degraded signal.

FIG. 15 is a flow chart showing an outline of how the failure diagnosis is executed beginning with the module with a degraded signal. First, the controller performs the failure diagnosis starting with the interior of the module with a degraded signal (step 1400). If the failed component can be determined here, the failure diagnosis is finished. However, if the failed component cannot be identified by the controller performing the failure diagnosis on the interior of the module with the degraded signal, it is then decided that the failure exists in another module. In that case, other modules are checked sequentially one by one (step 1402). Since the module with a degraded signal has already been identified, there is no need to perform the failure diagnosis in step 1402. If the controller can detect the failure in another module, the interior of that module is checked (step 1403). If the failed component in the malfunctioning module is identified, the controller terminates the failure diagnosis.

In this embodiment, since the signal degradation detection circuits are provided in each module, a signal degradation can be detected before a failure results. In the event that a failure occurs in an FC loop, because the controller has already identified which module has a degraded signal, the controller can start the failure diagnosis with the module with the degraded signal and finish it in a short period of time.

Further, this embodiment offers an advantage of being able to execute the failure diagnosis on the storage system within a time-out period set by a higher level device without adversely affecting the normal processing such as read and write operations requested by the higher level device.

Further, this embodiment offers an advantage of being able to minimize, in the event of a failure, degradations in performance and reliability of the storage system equipped with a communication path.

Further, this embodiment offers an advantage of being able to swiftly, easily and correctly identify a failed component and perform a recovery operation in the storage system equipped with a communication path.

Further, this embodiment offers an advantage of being able to reliably perform recovery operations in the storage system with multiple communication path in the event of multiple failures occurring in a plurality of communication path.

(Third Embodiment)

Figure 16:
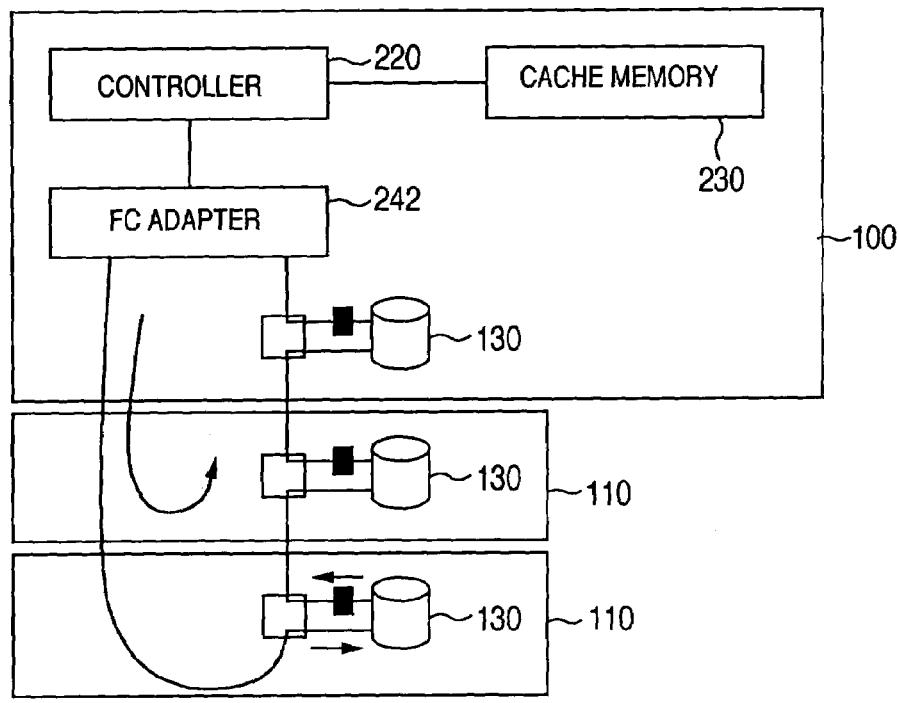
FIG. 16 illustrates a configuration of the storage system with the signal degradation detection circuit provided at a data-out port of each hard disk drive.

As a variation of FIG. 13, this storage system has a signal degradation detection circuit provided for each hard disk drive, rather than for each module. The configuration of this embodiment is shown in FIG. 16. In FIG. 16, the signal degradation detection circuit detects a degradation of signal output from a hard disk drive. Checking the output signal from each hard disk drive with the signal degradation detection circuit allows the controller to have more detailed information on the signal degrading portion than when the signal degradation detection circuits are provided in each module. As for the precision to which the signal degrading portion can be located, since the failed component lies between adjoining signal degradation detection circuits, it is possible to determine whether the signal degradation is caused by the hard disk drive or the FC loop.

The check flow to identify the signal degrading portion is almost the same as that shown in FIG. 14. The only point in which it differs from FIG. 14 is that the locating the signal degrading portion performed in step 1304 is done for each hard disk drive, rather than for each module.

Figure 17:
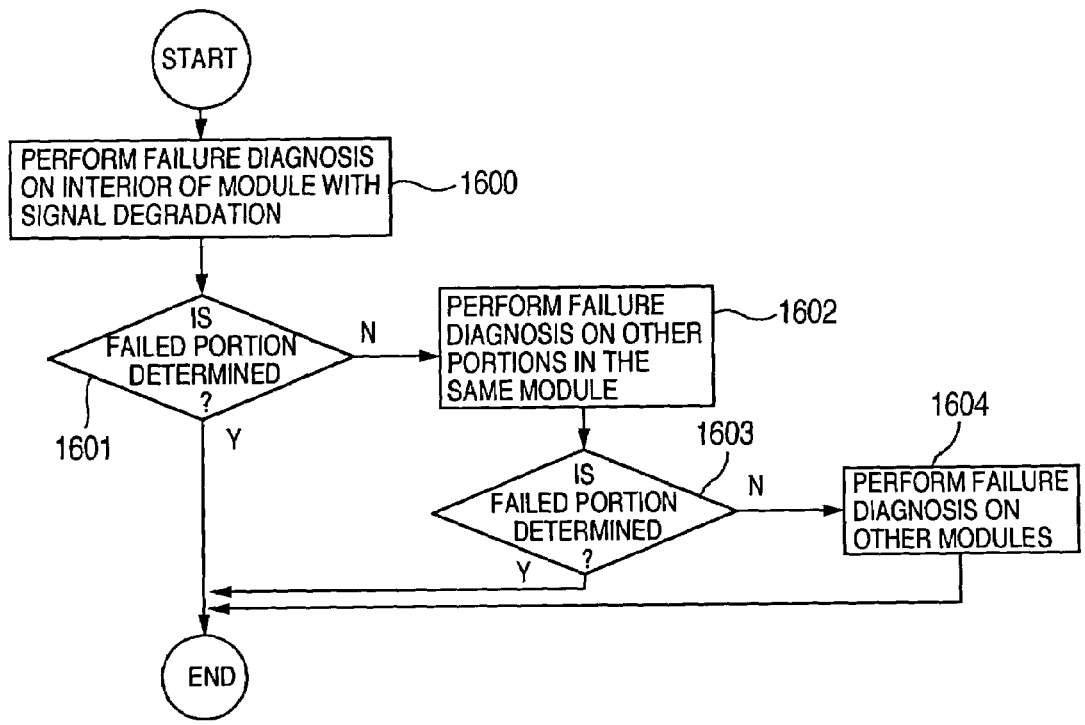
FIG. 17 is a flow chart showing the failure diagnosis when the signal degradation detection circuit is provided.

Further, when a failure occurs in the FC loop in which a signal degradation has been detected, a check is made as shown in FIG. 17. Since a chance is high that the failure may have occurred at the signal degrading portion in the malfunctioning FC loop, the failure diagnosis is executed to see if the failure has occurred at the signal degrading portion (step 1600). That is, this diagnosis is performed on a part of the FC Loop or a hard disk drive that has caused the signal degradation. First, to check if the failure exists in the FC loop, the FC loop extending from the PBC to the hard disk drive are disconnected from the hard disk drive and the PBC. Next, to determine if the failure exists in the hard disk drive, the controller on the opposite side performs the failure diagnosis on the hard disk drive that may have caused the signal degradation.

If the portion that has caused the failure cannot be identified, the same failure diagnosis is performed on other portions in the same module (step 1602). If the controller cannot determine the failed portion in the same module, it performs the same failure diagnosis on other modules (step 1604).

Installing the signal degradation detection circuit at an output of each hard disk drive allows the controller to have more detailed information about the signal degrading portion than when the signal degradation detection circuits are provided in each module.

Further, this embodiment offers an advantage of being able to execute the failure diagnosis on the storage system within a time-out period set by a higher level device without adversely affecting the normal processing such as read and write operations requested by the higher level device.

Further, this embodiment offers an advantage of being able to minimize, in the event of a failure, degradations in performance and reliability of the storage system equipped with a communication path.

Further, this embodiment offers an advantage of being able to swiftly, easily and correctly identify a failed component and perform a recovery operation in the storage system equipped with a communication path.

Further, this embodiment offers an advantage of being able to reliably perform recovery operations in the storage system with multiple communication path in the event of multiple failures occurring in a plurality of communication paths.

(Fourth Embodiment)

Figure 18:
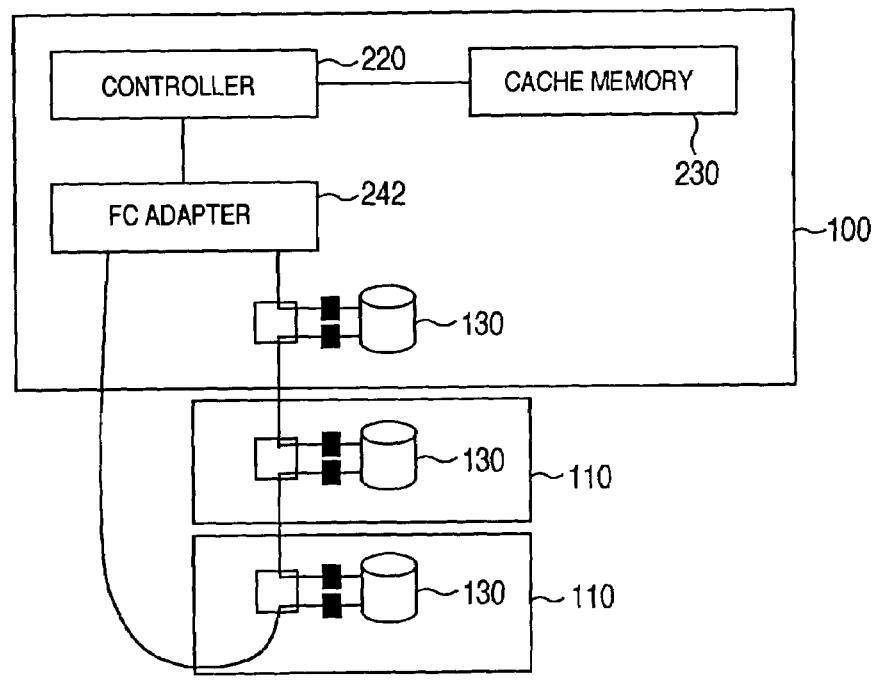
FIG. 18 illustrates a configuration of the storage system with the signal degradation detection circuit provided at a data-out port and a data-in port of each hard disk drive.

FIG. 18 illustrates an example storage system, a variation of FIG. 13 and FIG. 16, in which the signal degradation detection circuit is provided at both an input and an output of each hard disk drive. Since the signal degradation detection circuits in this embodiment can detect signal degradations in both of the input and output signals of the hard disk drive, the signal degrading portion can be located more precisely than when the signal degradation detection circuit is provided at only one of the input and output of the hard disk drive.

When a failure occurs in an FC loop with a degraded signal, since there is a high possibility of the failure having occurred at the signal degrading portion, the controller initiates the failure diagnosis first on the signal degrading portion. The diagnosis flow is almost the same as that of FIG. 17, except for step 1600 of FIG. 17. If the portion that has caused the signal degradation is the hard disk drive, the controller performs the failure diagnosis on the hard disk drive by using a redundant loop. If the FC loop between hard disk drives has caused the signal degradation, the failure diagnosis is executed on the FC loop with the degraded signal by using the malfunctioning loop. In this embodiment, because the signal degradation detection circuit is provided at each of the input and output of each hard disk drive, it is possible to determine whether the signal degradation is caused by the FC loop or the hard disk drive.

In the storage system with the signal degradation detection circuits, when a signal degradation is detected in the FC loop, it is possible to locate a portion that has caused the signal degradation and inform it to a maintenance staff before it results in a failure. Further, if a failure occurs in the FC loop connected with the signal degrading portion, the controller executes the failure diagnosis beginning with the signal degrading portion, thereby swiftly detecting the failed component and minimizing performance and reliability degradations. Further, this storage system allows for swift and precise maintenance operations such as recovery from failure.

Further, this embodiment offers an advantage of being able to execute the failure diagnosis on the storage system within a time-out period set by a higher level device without adversely affecting the normal processing such as read and write operations requested by the higher level device.

Further, this embodiment offers an advantage of being able to minimize, in the event of a failure, degradations in performance and reliability of the storage system equipped with a communication path.

Further, this embodiment offers an advantage of being able to swiftly, easily and correctly identify a failed component and perform a recovery operation in the storage system equipped with a communication path.

Further, this embodiment offers an advantage of being able to reliably perform recovery operations in the storage system with multiple communication path in the event of multiple failures occurring in a plurality of communication paths.

(Fifth Embodiment)

Figure 19:
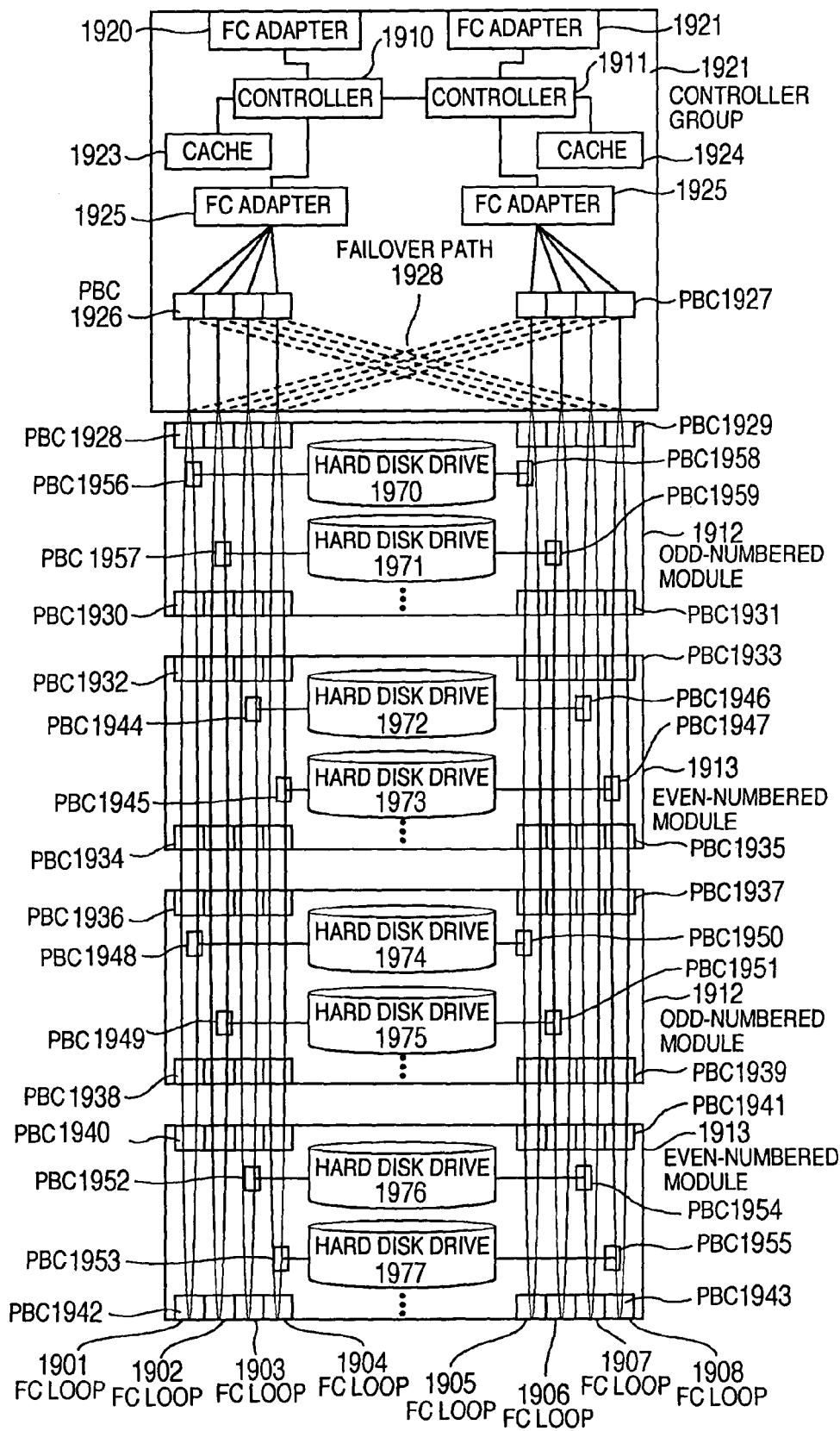
FIG. 19 illustrates a configuration of the storage system in which odd-numbered modules and even-numbered modules are separated.

FIG. 19 is a conceptual diagram of this embodiment. In a normal state, a controller 1910 controls FC loops 1901–1904 and a controller 1911 controls FC loops 1905–1908. Odd-numbered modules 1912 are connected to FC loops 1901, 1902 and FC loops 1905, 1906. Even-numbered modules 1913 are connected to FC loops 1903, 1904 and FC loops 1907, 1908.

Since the even-numbered modules 1913 and the odd-numbered modules 1912 use different FC loops, they have no adverse effects on adjoining modules. This allows the even-numbered modules 1913 and the odd-numbered modules 1912 to execute failure diagnoses separately, enhancing reliability. Further, since a greater number of FC loops are provided than in the systems of FIG. 2 and FIG. 3, the controller can perform read/write operations on hard disk drives at higher speed.

The present invention has been described in detail in conjunction with example embodiments. It should be noted, however, that the present invention is not limited to these embodiments but that modifications can be made without departing from the spirit of the invention.

For example, the failure diagnoses of the above embodiments bypass only those hard disk drives in a module that is determined to be faulty and locate a failed component. The present invention is not limited to this method. The controller may disconnect all the hard disk drives in an FC loop that is malfunctioning, locate a faulty module and then check one hard disk drive at a time in the faulty module to determine the failed hard disk drive. Further, when there are two or more malfunctioning modules, the hard disk drives in the faulty modules are bypassed and then connected one by one to determine which hard disk drive is failed. With this method, it is possible to recover from failures when there are two or more failed hard disk drives.

The method of indicating a failed portion is not limited to the one using an indicator lamp. For example, a system configuration diagram such as shown in FIG. 3 may be displayed on a screen of a control terminal 280 that controls the controller from outside and the faulty point may be visualized on the system configuration diagram.

Further, the communication means is not limited to FC loops but may use other communication path, such as optical fibers and copper wires.

Further, the storage means is not limited to hard disk drives but may use optical discs and memories.

In cases where a failure occurs only with a certain probability and is difficult to reproduce, the controller can set a probability level at which the phenomenon is deemed a failure. In this method, the controller issues a failure diagnosis command a plurality of times, calculates a response ratio based on the number of times that a response has been received and, if the response ratio is less than a predetermined level, decides that a failure has occurred.

Further, this embodiment offers an advantage of being able to identify a failure of the storage system within the time out of the upper system without affecting ordinary writing or reading operation.

Further, this embodiment offers an advantage of being able to minimize, in the event of a failure, degradations in performance and reliability of the storage system equipped with a communication path.

Further, this embodiment offers an advantage of being able to swiftly, easily and correctly identify a failed component and perform a recovery operation in the storage system equipped with a communication path.

Further, this embodiment offers an advantage of being able to reliably perform recovery operations in the storage system with multiple communication path in the event of multiple failures occurring in a plurality of communication paths.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage system comprising:
   a first controller coupled to a host computer and controlling to transfer data sent from said host computer to a plurality of storage regions;
   a plurality of data lines coupled to said first controller and being used to transfer data from said first controller to said storage regions;
   a plurality of disk drive units coupled to said plurality of data lines and having said storage regions; and
   wherein said first controller transfers data on a first data line of said data lines and transfers a command on a second data line of said data lines, if said storage system has a failure after transferring data on said second data line,
   wherein said command is used to obtain an area of said failure, and
   wherein said host computer sends a write command to said first controller and can receive acknowledgement of completion of said write command between occurrence of said failure and obtaining said area of said failure.

2. A storage system according to claim 1, comprising:
   a display coupled to said first controllers and displaying information related to said storage system,
   wherein said display displays said area of said failure.

3. A storage system according to claim 1, wherein:
   said first controller transfers write data on said first data line and controls to divide said second data line into a plurality of parts and transfers said command to one part of said parts of said second data line, and
   said area of said failure is obtained after said second data line is divided.

4. A storage system according to claim 1, further comprising:
   a first housing having one or more first disk drive units of said plurality of disk drive units and a first part of said second line, which coupled to said first disk drive units;
   a second housing having one or more second disk drive units of said plurality of disk drive units and a second part of said second line, which coupled to said second disk drive units; and
   a plurality of controllers, which has said first controller, coupled to said first data line and said second data line;
   wherein said first controller transfers write data on said first data line and controls to disconnect said second part of said second data line from said first part of said second data line and transfers said command to said first part of said second data line, and
   said area of said failure is obtained after said second part of said second data line is disconnected.

5. A storage system according to claim 1, wherein:
   said first data line is used to read/write data to one or more said disk drive units, if said area of said failure is on said second data line, and
   said second data line is used to read/write data to said one or more said disk drive units, if said area of said failure is not on said second data line.

6. A storage system according to claim 1, wherein:
   said command travels around on said second data line.

7. A storage system according to claim 1, wherein:
said command is relayed by one or more of said disk drive units coupled to said second data line, if said second data line does not have said failure.

8. A storage system according to claim 1, wherein:
said command is used to initialize said second data line.

9. A storage system according to claim 1, wherein:
said command is a Loop Initialization Primitive (LIP) command.

10. A storage system according to claim 1, wherein:
said second data line is a Fibre Channel Arbitrated Loop (FC-AL).

11. A storage system according to claim 1, wherein:
said area of said failure is located between said second data line and one of said plurality of disk drive units.

12. A storage system according to claim 1, wherein:
said area of said failure is in one of said plurality of disk drive units.

13. A storage system according to claim 1, further comprising:
a first housing having one or more first disk drive units of said plurality of disk drive units and a first part of said plurality of data lines; and
a second housing having one or more second disk drive units of said plurality of disk drive units and a second part of said plurality of data lines;
wherein said area of said failure is in one of said first housing and said second housing.

14. A storage system according to claim 1, wherein:
said first data line is coupled to a second controller,
said second data line is coupled to said first controller, and
said first controller controls sending of said command to said second data line.

15. A storage system according to claim 1, wherein:
said plurality of disk drive units are coupled to said first data line and said second data line.

16. A storage system according to claim 1, further comprising:
a first housing having one or more first disk drive units of said plurality of disk drive units;
a second housing having one or more second disk drive units of said plurality of disk drive units;
said first controller being coupled to said second data line and a third data line of said plurality of data lines; and
a second controller being coupled to said first data line and a fourth data line of said plurality of data lines;
wherein said first disk drive units are coupled to said first data line and said second data line, and
wherein said second disk drive units are coupled to said third data line and said fourth data line.

17. A storage system according to claim 1, further comprising:
a first housing having one or more first disk drive units and one or more second disk drive units of said plurality of disk drive units;
a second housing having one or more third disk drive units and one or more fourth disk drive units of said plurality of disk drive units;
said first controller being coupled to said second data line and a third data line of said plurality of data lines; and
a second controller being coupled to said first data line and a fourth data line of said plurality of data lines;
wherein said first disk drive units are coupled to said first data line and said second data line,
wherein said second disk drive units are coupled to said third data line and said fourth data line,
wherein said third disk drive units are coupled to said first data line and said second data line, and
wherein said fourth disk drive units are coupled to said third data line, and said fourth data line.

18. A storage system, comprising:
one or more controllers coupled to a host computer and controlling to transfer data sent from said host computer to a plurality of storage regions;
a plurality of data lines coupled to said controllers and being used to transfer data from said controllers to said storage regions;
a plurality of disk drive units coupled to said plurality of data lines and having said storage regions; and
a display coupled to said controller and displaying information related to said storage system;
wherein a first controller of said controllers transfers a command on a second data line of said plurality of data lines and transfers data on a first data line of said plurality of data lines, if said storage system has a failure after transferring data on said second data line,
wherein said command travels around on said second data line,
wherein said display displays an area of said failure, and
wherein said host computer sends a write command to said first controller and can receive acknowledgment of completion of said write command between occurrence of said failure and displaying said area of said failure.

19. A storage system, comprising:
a first controllers coupled to a host computer and controlling to transfer data sent from said host computer to a plurality of storage regions;
a plurality of data lines coupled to said first controllers and being used to transfer data from said first controllers to said storage regions;
a plurality of disk drive units coupled to said plurality of data lines and having said storage regions; and
a display coupled said first controller and displaying information related to said storage system;
wherein said first controller relays a command on a second data line of said plurality of data lines, if said storage system has a failure after relaying data on said second data line,
wherein said command is used to initialize said second data line,
wherein said display displays an area of said failure, and
wherein said host computer sends a write command to said first controller and can receive acknowledgment of completion of said write command between occurrence of said failure and displaying said area of said failure.

20. A storage system, comprising:
a plurality of controllers coupled to a host computer and controlling to transfer data sent from said host computer to a plurality of storage regions;
a plurality of data lines coupled to said controllers and being used to transfer data from said controllers to said storage regions; and
a plurality of disk drive units coupled to said plurality of data lines and having said storage regions;
wherein a first controller transfers a command on a second data line of said plurality of data lines and transfers data on a first data line of said plurality of data lines, if said storage system has a failure after transferring data on said second data line,
wherein said command is used to obtain an area of said failure, and
wherein said host computer sends a write command to said first controller and can receive acknowledgment of completion of said write command between occurrence of said failure and obtaining said area of said failure.

21. A storage system, comprising:

a controller coupled to a host computer and controlling to transfer data sent from said host computer to a plurality of storage regions;

a plurality of data lines coupled to said controllers and being used to transfer data from said controllers to said storage regions;

a plurality of disk drive units coupled to said plurality of data lines and having said storage regions; and wherein data are relayed by said controller on a first data line of said plurality of data lines and a command is relayed by said controller on a second data line of said plurality of data lines, if said storage system has a failure after relaying data on said second data line, wherein said command is used to obtain an area of said failure, and wherein said host computer sends a write command to said controller and can receive acknowledgment of completion of said write command between occurrence of said failure and obtaining said area of said failure.

22. A storage system, comprising:

one or more controllers coupled to a host computer and controlling to transfer data sent from said host computer to a plurality of storage regions;

a plurality of data lines coupled to said controllers and being used to transfer data from said controllers to said storage regions;

a plurality of disk drive units coupled to said plurality of data lines and having said storage regions;

wherein said storage system performs the steps of:

transferring data on a first data line of said plurality of data lines coupled to a first controller of said controllers, having a failure between said first data line and one of said disk drives after said transferring data on said first data line, transferring a command on said first data line by said first controller and transferring data on a second data line of said plurality of data lines by said first controller after having said failure, said command being used to obtain a position of said failure, and receiving a write command from said host computer to said first controller and sending acknowledgment of completion of said write command between occurrence of said failure and obtaining said position of said failure.

\* \* \* \* \*